United States Patent
Nakata et al.

(10) Patent No.: US 9,251,836 B2
(45) Date of Patent: Feb. 2, 2016

(54) OPTICAL DISC APPARATUS, SHEET MEMBER, AND METHOD FOR CLEANING OBJECTIVE LENS

(71) Applicant: Panasonic Corporation, Osaka (JP)

(72) Inventors: Hideki Nakata, Kyoto (JP); Kousei Sano, Osaka (JP); Hideki Aikoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/370,125

(22) PCT Filed: Jun. 3, 2013

(86) PCT No.: PCT/JP2013/003478
§ 371 (c)(1),
(2) Date: Jul. 1, 2014

(87) PCT Pub. No.: WO2014/073129
PCT Pub. Date: May 15, 2014

(65) Prior Publication Data
US 2014/0380342 A1 Dec. 25, 2014

(30) Foreign Application Priority Data
Nov. 6, 2012 (JP) .................. 2012-244167

(51) Int. Cl.
*G11B 33/14* (2006.01)
*G11B 7/121* (2012.01)
*G11B 17/056* (2006.01)

(52) U.S. Cl.
CPC .............. *G11B 7/121* (2013.01); *G11B 17/056* (2013.01); *G11B 33/1446* (2013.01)

(58) Field of Classification Search
CPC .................................. G11B 33/1446

USPC .................................. 720/603, 611
See application file for complete search history.

(56) References Cited

U.S. PATENT DOCUMENTS 4,581,668 A * 4/1986 Campbell .................. 369/72
5,245,601 A * 9/1993 Hake ............................ 369/72

(Continued)

FOREIGN PATENT DOCUMENTS

JP    6-203402       7/1994
JP    2004-310933   11/2004

(Continued)

OTHER PUBLICATIONS

International Search Report issued Jul. 2, 2013 in International (PCT) Application No. PCT/JP2013/003478.

*Primary Examiner* — Brian Miller
(74) *Attorney, Agent, or Firm* — Wenderoth, Lind & Ponack, L.L.P.

(57) ABSTRACT

The present application discloses optical disc apparatus including: drive mechanism for rotating medium including processing surface to be subjected optical information process; housing for storing drive mechanism; tray mechanism for displacing medium between storage position, at which medium is stored in housing, and ejection position, at which medium is ejected from housing; at least one objective lens for condensing light onto processing surface of medium situated at storage position to perform information process; and first displacement mechanism for displacing at least one objective lens along processing surface between first position and second position which is more distant from rotational center of medium rotated by the drive mechanism than first position is. Tray mechanism defines at least one opening in position closer to second position than first position.

14 Claims, 39 Drawing Sheets

(56) References Cited

U.S. PATENT DOCUMENTS

| | | | |
|---|---|---|---|
| 5,790,511 A * | 8/1998 | Juso et al. | 720/671 |
| 5,920,539 A * | 7/1999 | Schell et al. | 720/658 |
| 6,151,283 A * | 11/2000 | Kobayashi | 369/71 |
| 6,317,402 B1 * | 11/2001 | Huang et al. | 720/603 |
| 6,392,976 B1 * | 5/2002 | Lin | 720/611 |
| 7,350,220 B2 * | 3/2008 | Obata et al. | 720/671 |
| 7,421,720 B2 * | 9/2008 | Wakabayashi et al. | 720/649 |
| 7,430,748 B2 * | 9/2008 | Wu | 720/611 |
| 7,448,053 B2 * | 11/2008 | Wu | 720/651 |
| 7,543,310 B2 * | 6/2009 | Shizuya et al. | 720/601 |
| 7,565,716 B2 * | 7/2009 | Watanabe | 15/300.1 |
| 8,064,311 B2 * | 11/2011 | Holbrook et al. | 369/71 |
| 8,488,421 B2 * | 7/2013 | Matsumura et al. | 369/44.14 |
| 8,559,281 B2 * | 10/2013 | Loh et al. | 369/30.36 |
| 2003/0133389 A1 * | 7/2003 | Wang | 369/75.2 |
| 2003/0185131 A1 * | 10/2003 | Choi | 369/75.2 |
| 2004/0066727 A1 * | 4/2004 | Wu et al. | 369/75.2 |
| 2004/0255311 A1 | 12/2004 | Obata et al. | |
| 2005/0086675 A1 * | 4/2005 | Lee et al. | 720/648 |
| 2005/0193404 A1 | 9/2005 | Omori et al. | |
| 2006/0096059 A1 | 5/2006 | Watanabe | |
| 2007/0079312 A1 * | 4/2007 | Isoshima et al. | 720/648 |
| 2008/0259777 A1 * | 10/2008 | Boku et al. | 369/121 |

FOREIGN PATENT DOCUMENTS

| | | |
|---|---|---|
| JP | 2005-243126 | 9/2005 |
| JP | 2005-327350 | 11/2005 |
| JP | 2008-112498 | 5/2008 |

* cited by examiner

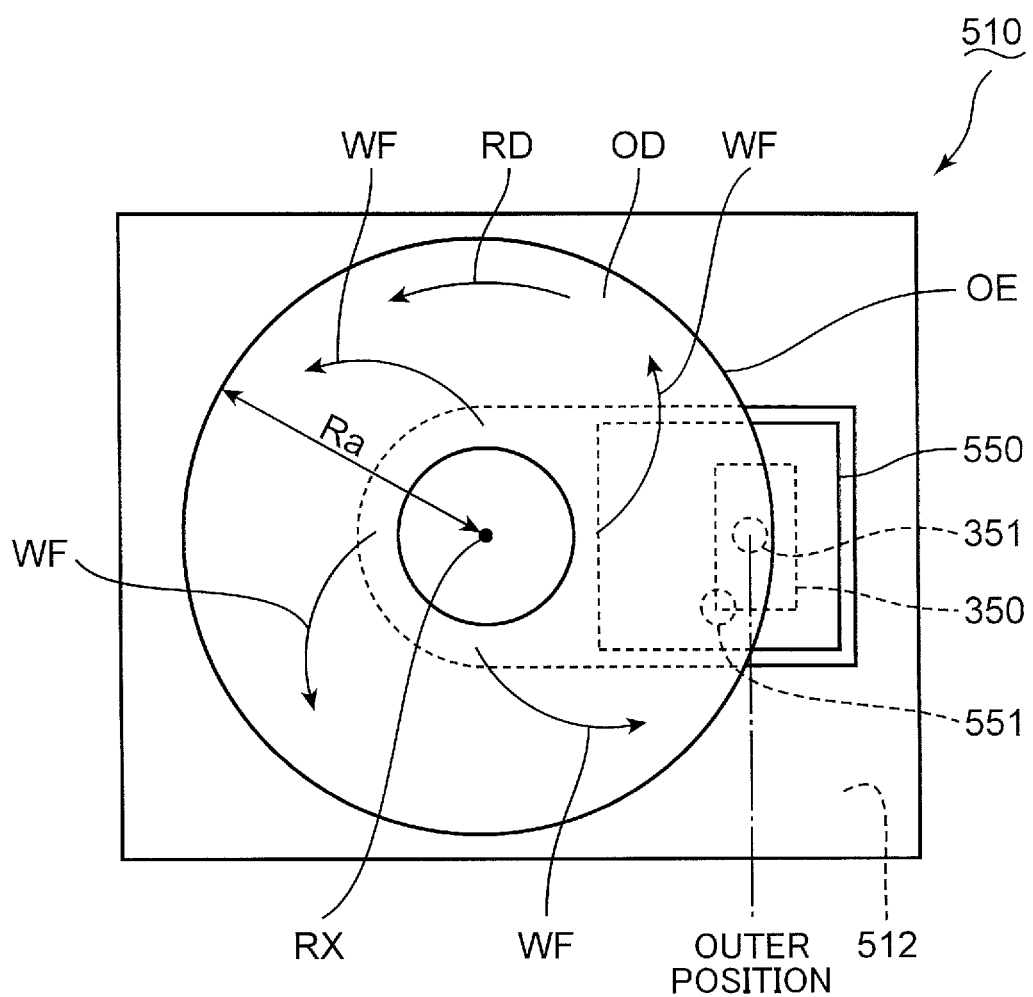

(UNDER INFORMATION PROCESS CONTROL)

(UNDER CLEANING CONTROL)

(UNDER INFORMATION PROCESS CONTROL)

FRONT SIDE

REAR SIDE (UNDER CLEANING CONTROL)

(UNDER INFORMATION PROCESS CONTROL)

(UNDER CLEANING CONTROL)

OPTICAL DISC APPARATUS, SHEET MEMBER, AND METHOD FOR CLEANING OBJECTIVE LENS

TECHNICAL FIELD

The present invention relates to cleaning techniques for an objective lens which is used for optically processing information.

BACKGROUND ART

High stability of performance in recording process and reproducing process of information is required for consumer optical disc apparatuses and optical disc apparatuses used for archiving data in business facilities such as data centers.

A digital video disc (DVD) and a Blu-ray disc (BD) among media used for optical disc apparatuses have large storage capacities. Therefore, it is expected that applications of optical disc apparatuses which uses a DVD and a BD to perform optical information process will greatly expand in future. Therefore, highly reliable optical disc apparatuses are required.

Dust is one of factors which make performance of an optical disc apparatus unstable. Dust may be removed to some extent during fabrication of an optical head which is incorporated in an optical disc apparatus or during fabrication of the optical disc apparatus. However, it is difficult to completely remove dust.

Even if dust is removed during the manufacturing process, the dust may adhere to an objective lens which is incorporated in the optical head/optical disc apparatus while the optical head or the optical disc apparatus is in use.

A hard disc drive device has a completely sealed structure into which a drive mechanism and a disc are integrated. Therefore, little dust adheres to an objective lens of the hard disc drive device. On the other hand, a medium (optical disc) used for an optical disc apparatus has to be ejected from the optical disc apparatus. Therefore, the optical disc is not sealed and fixed inside the optical disc apparatus. Accordingly, the optical disc apparatus is more likely to be susceptible to dust than the hard disc device is.

The optical head incorporated in the optical disc apparatus is used for recording information onto an optical disc and/or reproducing information from an optical disc. The optical disc apparatus includes a turntable and a spindle motor in addition to the optical head. The optical disc is mounted on the turntable. The spindle motor drives the turntable to rotate the optical disc. While the optical disc rotates, the optical disc apparatus moves the optical head in the radial direction of the optical disc to perform information process such as recording information onto the optical disc and/or reproducing information from the optical disc.

The optical disc apparatus includes a light source and a photo-receiver. The light source emits a laser beam. The objective lens incorporated in the optical head condenses the laser beams onto the recording surface of the optical disc. Information is written to the optical disc by condensing the laser beams onto the recording surface. Or, condensing the laser beams onto the recording surface results in reflected light which is reflected by the recording surface. The reflected light reaches the photo-receiver through the objective lens. The photo-receiver outputs signals in response to the reflected light. The optical disc apparatus may use the output signals from the photo-receiver to reproduce the information recorded on the optical disc.

Dust adhering to the objective lens interrupts propagation of light. Therefore, information process such as recording information onto the optical disc or reproducing information from the optical disc is likely to be susceptible to the dust. If the optical disc apparatus attempts to read signals (information) recorded on the optical disc using the reflected light under an environment in which dust adheres to the objective lens, there may be frequent signal read errors. In this case, a user mounts a cleaning disc on the optical disc apparatus to make a brush of the cleaning disc contact the objective lens. Consequently, the dust adhering to the objective lens may be removed (c.f. Patent Document 1).

A cleaning solution may be applied to the brush of the cleaning disc (wet type). Alternatively, the brush may rub against the objective lens without cleaning solution (dry type). In both cases of the wet and dry types, dust and dirt from the exhaust gas and smoke in the air may be removed from the objective lens by the brush contacting the objective lens.

According to Patent Document 1, the brush is situated near the inner edge of the cleaning disc. Since the position of the brush corresponds to a position of a management information area which is accessed to identify the medium, the brush may contact the objective lens.

FIG. 30 is a schematic cross-sectional view of a conventional optical disc apparatus 900. The optical disc apparatus 900 is described with reference to FIG. 30.

The optical disc apparatus 900 includes an objective lens 910, a lens holder 920, a protector 930, a spindle motor 940, a turntable 950 and a drive holder 960. An optical disc OD is mounted on the turntable 950. The spindle motor 940 rotates the turntable 950 and the optical disc OD.

The objective lens 910 and the protector 930 are attached to the lens holder 920. The cylindrical protector 930 surrounds the objective lens 910. The upper edge of the protector 930 is closer to the lower surface of the optical disc OD than the upper surface of the objective lens 910, which faces the lower surface of the optical disc OD. Therefore, the protector 930 may prevent contact between the objective lens 910 and the optical disc OD.

The drive holder 960 uses a holding wire (not shown) to elastically suspend the lens holder 920. The drive holder 960 moves the lens holder 920 and the objective lens 910 in the radial direction of the optical disc OD.

FIG. 31 is a schematic cross-sectional view of the optical disc apparatus 900 which is subjected to a dry type cleaning process. The cleaning process for the optical disc apparatus 900 is described with reference to FIGS. 30 and 31.

A cleaning disc DCD is mounted on the turntable 950 shown in FIG. 31, instead of the optical disc OD. The cleaning disc is provided with a cleaning brush DCB. The cleaning brush DCB gently rubs against the objective lens 910. Meanwhile, a pressing force (indicated by the arrow in FIG. 31), which acts on the objective lens 910, displaces the objective lens 910 downward. Consequently, the cleaning brush DCB may not apply a sufficient force to the objective lens 910 to remove dust and dirt from the objective lens 910.

FIG. 32 is a schematic cross-sectional view of the optical disc apparatus 900 which is subjected to a wet type cleaning process. The cleaning process for the optical disc apparatus 900 is described with reference to FIGS. 31 and 32.

A cleaning disc WCD is mounted on the turntable 950 shown in FIG. 32, instead of the cleaning disc DCD used for the dry type cleaning process. The cleaning disc WCD is provided with a cleaning brush WCB. Unlike the cleaning brush DCB used for the dry type cleaning process, a cleaning solution is applied to the cleaning brush WCB. The cleaning brush WCB gently rubs against the objective lens 910, like the cleaning brush DCB used for the dry type cleaning process. Meanwhile, a pressing force (indicted by the arrow in FIG. 32), which acts on the objective lens 910, displaces the objective lens 910 downward. Consequently, the cleaning brush WCB may not apply a sufficient force to the objective lens 910 to remove dust and dirt from the objective lens 910.

During the aforementioned cleaning processes, the objective lens 910 is fixedly held in a direction orthogonal to the optical axis. However, the objective lens 910 is elastically held in a direction parallel with the optical axis. Therefore, as described above, the objective lens 910 is displaced downward by the pressing force from the cleaning brush DCB or WCB. If the objective lens 910 displaces downward, the rubbing force applied to the objective lens 910 is weakened. Accordingly, the dust and dirt may not be removed from the objective lens 910.

If an excessively strong force is applied to the objective lens 910, plastic deformation may happen to a support member configured to elastically support the objective lens 910. An objective lens of an optical disc apparatus which uses a BD has a very short working distance, in comparison with an optical disc apparatus which uses a DVD. For example, a working distance of an optical disc apparatus for a DVD is set to approximately 1.5 mm whereas a working distance of an optical disc apparatus for a BD is set to a value in a range from 0.2 mm to 0.3 mm. Therefore, if a cleaning disc DCD or WCD which has a cleaning brush DCB or WCB is used for cleaning an objective lens of an optical disc apparatus which uses a BD, an excessively strong pressing force is likely to be applied to the objective lens 910. The excessively strong pressing force may make a focus setting of the objective lens 910 inappropriate. The pressing force may damage an actuator for driving the lens.

FIG. 33 is a schematic cross-sectional view of the optical disc apparatus 900 which is subjected to the wet type cleaning process. Problems of the conventional cleaning process are described with reference to FIGS. 30 to 33. The problems described with reference to FIG. 33 are in common with the dry type cleaning process.

The cleaning brush WCB may apply a diagonal pressing force (indicated by the arrow in FIG. 33) to the objective lens 910. In this case, a torsional force is applied to the lens holder 920 which holds the objective lens 910. The torsional force may result in plastic deformation happening to the holding wire which suspends the lens holder 920.

The plastic deformation of the holding wire causes the objective lens 910 to execute an inappropriate focusing and/or tracking operations. In short, the objective lens 910 of the optical disc apparatus 900 after the cleaning process may not track the optical disc OD appropriately.

Contact of the cleaning brush DCB or WCB with the objective lens 910 may scratch a surface of the objective lens 910. Scratches may severely deteriorate reproduction performance of the optical disc apparatus. If the objective lens 910 is made of resin, scratches are likely to result from the contact of the objective lens 910 with the cleaning brush DCB or WCB.

An anti-reflection film is deposited on a surface of the objective lens 910 in consideration of transmittance, stray light and aberrations. The contact of the cleaning brush DCB or WCB with the objective lens 910 may result in dissipation of the anti-reflection film from the surface of the objective lens 910. Consequently, the optical transmittance of the objective lens 910 may drastically drop. Or, stray light may drastically increase because of scattered luminous flux resultant from the dissipation of the anti-reflection film. The dissipation of the anti-reflection film may cause a drastic growth in aberration. These changes in optical characteristics may drastically deteriorate the recording performance to record information onto the optical disc OD and the reproducing performance to reproduce information from the optical disc OD.

Patent Document 1: JP 2008-112498 A

SUMMARY OF THE INVENTION

The present invention provides techniques to remove dust appropriately.

An optical disc apparatus according to one aspect of the present invention includes: a drive mechanism configured to rotate a medium including a processing surface to be subjected to optical information process; a housing configured to store the drive mechanism; a tray mechanism configured to displace the medium between a storage position, at which the medium is stored in the housing, and an ejection position, at which the medium is ejected from the housing; at least one objective lens which condenses light onto the processing surface of the medium situated at the storage position to perform the information process; and a first displacement mechanism configured to displace the at least one objective lens along the processing surface between a first position and a second position which is more distant from the rotational center of the medium rotated by the drive mechanism than the first position is. The tray mechanism defines at least one opening in a position closer to the second position than the first position.

A sheet member according to another aspect of the present invention is mounted on a tray plate to be displaced between a storage position, at which a medium to be subjected to optical information process is stored in a housing, and an ejection position, at which the medium is ejected from the housing. The sheet member partially covers an opening area which is formed in the tray plate to define a movable range of the tray plate between the storage position and the ejection position. The sheet member is provided with an opening to blow air flow generated inside the housing by the rotation of the medium.

A cleaning method for an objective lens according to yet another aspect of the present invention includes steps of: placing an opening piece provided with an opening between a medium, which includes a processing surface to be subjected to optical information process and at least one objective lens facing the processing surface, so that the opening piece partially covers an opening area which is formed in the tray plate, the opening area defining a movable range of the tray plate on which the medium is mounted; and generating air flow by the rotation of the medium to exposing the at least one objective lens to the air flow blown from the opening.

The present invention may remove dust appropriately.

Objectives, features and advantages of the present invention will become more apparent upon reading the following detailed description along with the accompanying drawings.

BRIEF DESCRIPTION OF THE DRAWINGS

FIG. 12A is a schematic plan view of a tray plate of the optical disc apparatus in FIG. 1.

DETAILED DESCRIPTION OF THE INVENTION

Figure 1:
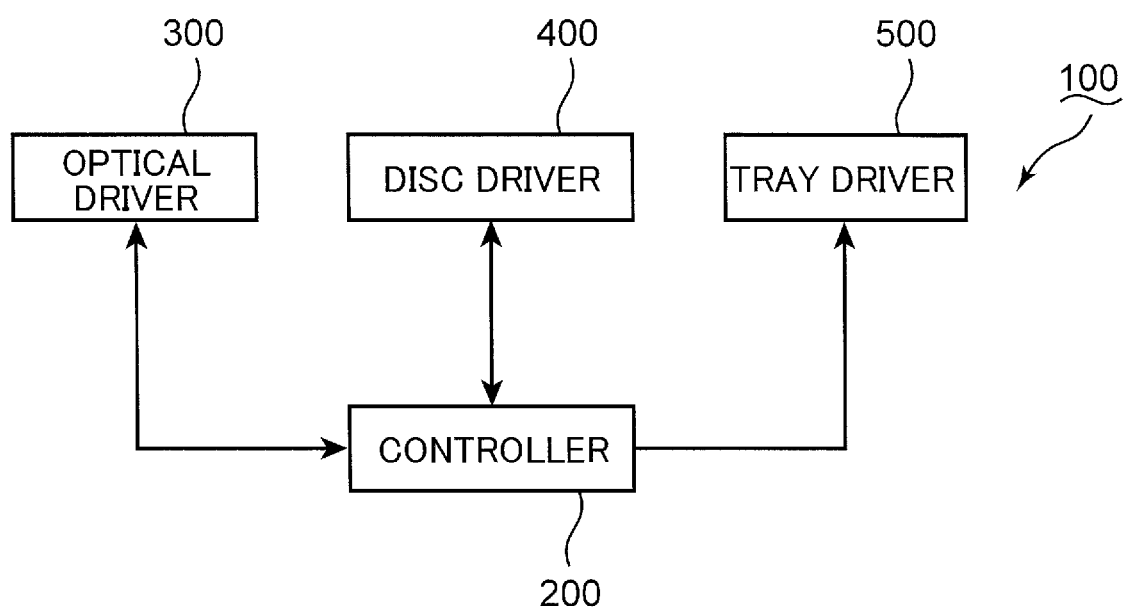
FIG. 1 is a schematic block diagram of an optical disc apparatus according to the first embodiment.

Various features of cleaning techniques for an objective lens are described with reference to the drawings. In the following embodiments, the same components are denoted with the same reference symbols. To clarify the description, redundant description may be omitted unless necessary. Configurations, arrangements and shapes shown in the drawings and description about the drawings are merely intended to make principles of the embodiments easily understood. Therefore, the principles of the embodiments are not limited thereto.

First Embodiment

Basic principles of cleaning techniques for an objective lens according to the first embodiment are described.
(Optical Disc Apparatus)

FIG. 1 is a schematic block diagram of an optical disc apparatus 100. The optical disc apparatus 100 is described with reference to FIG. 1.

The optical disc apparatus 100 includes a controller 200, an optical driver 300, a disc driver 400 and a tray driver 500. The optical driver 300, the disc driver 400 and the tray driver 500 operate under control of the controller 200.

The disc driver 400 rotates an optical disc such as a BD or DVD. The optical disc includes a processing surface which receives light irradiated from the optical driver 300. Information may be recorded onto the optical disc under irradiation of the light from the optical driver 300 to the processing surface. The processing surface reflects the light emitted from the optical driver 300 to cause reflected light. The optical driver 300 may receive the reflected light. The optical driver 300 may output signals to the controller 200 in response to the reflected light. The controller 200 may generate reproduction signals for reproducing information recorded on the optical disc in response to the signals from the optical driver 300. Techniques of recording information onto the optical disc or reproducing information from the optical disc may be recording or reproducing techniques of a conventional device, which performs information process on BDs and DVDs. In this embodiment, recording information onto an optical disc and/or reproducing information from an optical disc are exemplified as the optical information process. The optical disc is exemplified as the medium. The disc driver 400 is exemplified as the drive mechanism.

The disc driver 400 may rotate one optical disc. Alternatively, the disc driver 400 may rotate a plurality of optical discs. The principles of this embodiment are not limited by the number of optical discs used for the optical disc apparatus 100.

Light used for recording and reproducing information is emitted from an objective lens incorporated in the optical driver 300. The controller 200 selectively executes information process control for executing recording or reproducing information, and cleaning control for cleaning the objective lens.

While the controller 200 executes the information process control, the optical driver 300 moves the objective lens in the radial direction of the optical disc. Meanwhile, the disc driver 400 rotates the optical disc. Consequently, a light irradiation position changes on the processing surface, so that information is recorded onto the optical disc and/or information is reproduced from the optical disc.

While the controller 200 performs the cleaning control, the disc driver 400 also rotates the optical disc. Consequently, air flow is generated around the optical disc. Meanwhile, the optical driver 300 adjusts a position of the objective lens so that the objective lens is exposed to the air flow. The principles of this embodiment include various techniques to cause air flow which is strong enough to clean the objective lens.

One objective lens may be incorporated in the optical driver 300. Alternatively, a plurality of objective lenses may be incorporated in the optical driver 300. The principles of this embodiment are not limited by the number of objective lenses.

The tray driver 500 includes a tray plate, on which an optical disc is mounted, and a loading mechanism for driving the tray plate. Designing techniques used for conventional devices configured to perform information process on a BD or DVD may be applied to the tray plate and the loading mechanism.

In this embodiment, the tray driver 500 not only drives the tray plate but also contributes to generating air flow which is used for cleaning the objective lens.

Figure 2:
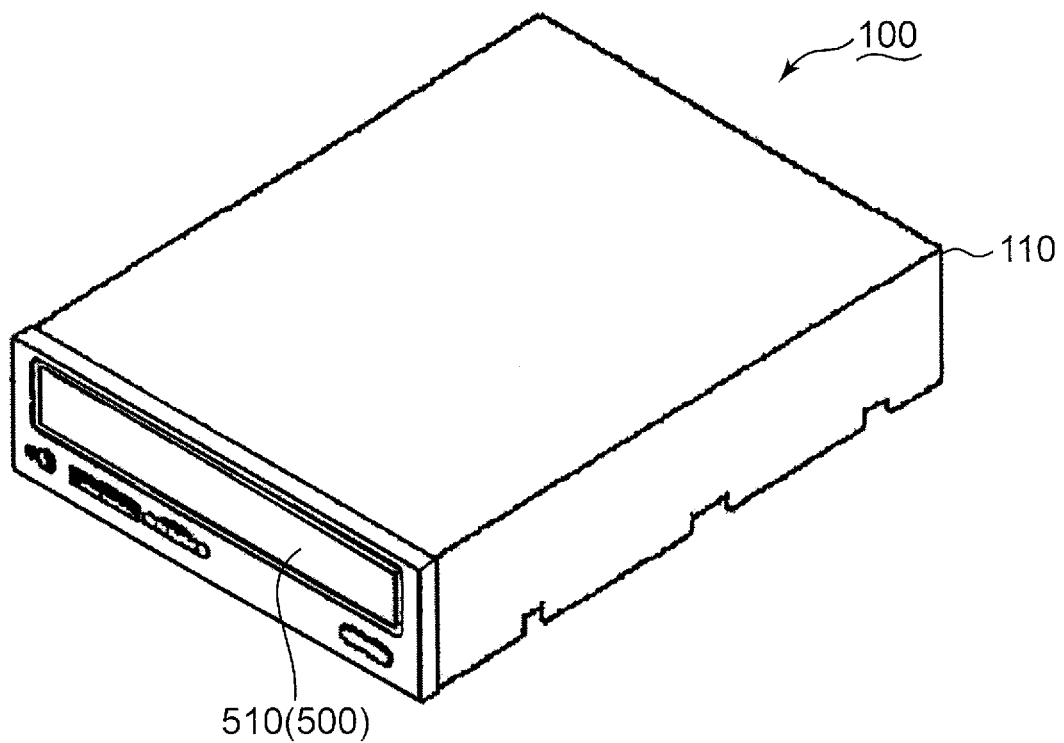
FIG. 2 is a schematic perspective view of the optical disc apparatus in FIG. 1.

FIG. 2 is a schematic perspective view of the optical disc apparatus 100. The optical disc apparatus 100 is further described with reference to FIGS. 1 and 2.

The optical disc apparatus 100 further includes a housing 110. The controller 200, the optical driver 300, the disc driver 400 and the tray driver 500 are stored in the housing 110. In FIG. 2, the tray plate is denoted with the reference numeral "510".

Figure 3:
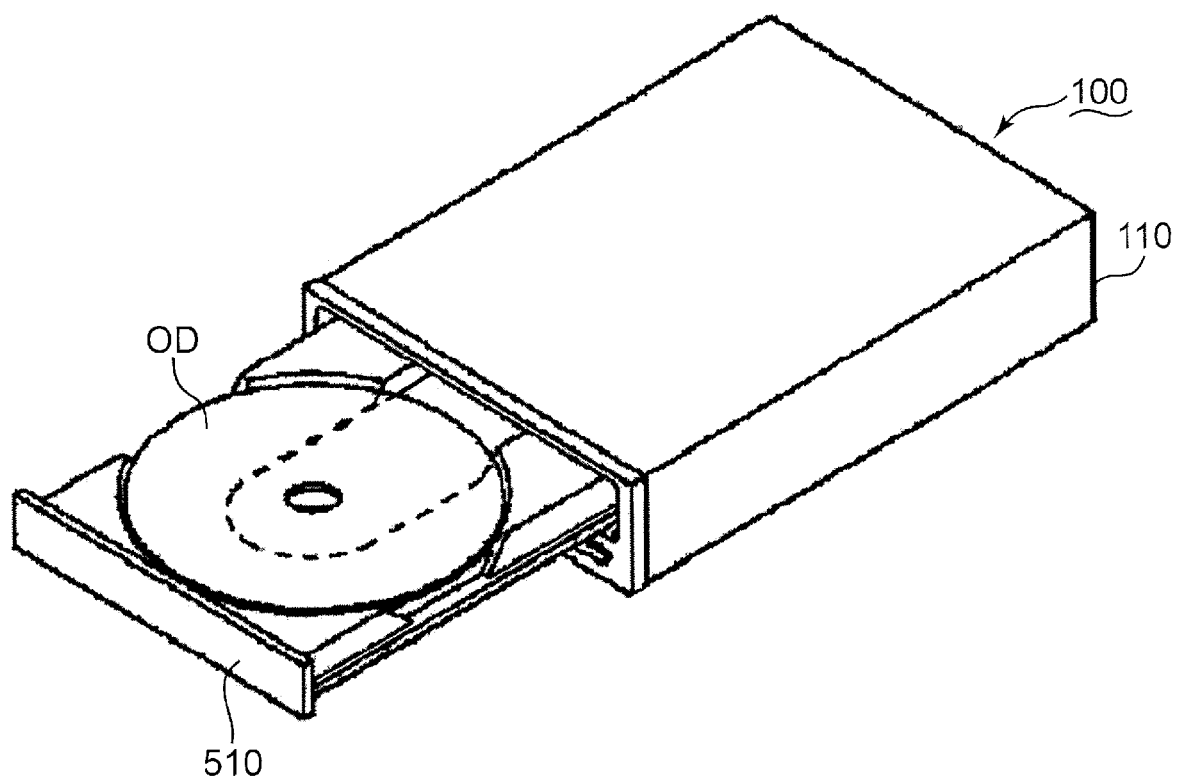
FIG. 3 is a schematic perspective view of the optical disc apparatus in FIG. 1.

FIG. 3 is a schematic perspective view of the optical disc apparatus 100. The optical disc apparatus 100 is further described with reference to FIGS. 1 to 3. In FIG. 3, the optical disc is denoted with the reference symbol "OD".

As shown in FIG. 3, the optical disc OD is mounted on the tray plate 510. As shown in FIGS. 2 and 3, the tray driver 500 displaces the tray plate 510 to move the optical disc OD between a storage position and an ejection position. The position of the optical disc OD and the tray plate 510 shown in FIG. 2 is the storage position. At the storage position, the optical disc OD is stored in the housing 110. The position of the optical disc OD and the tray plate 510 shown in FIG. 3 is the ejection position. At the ejection position, the optical disc OD is ejected from the housing 110. In this embodiment, the tray driver 500 is exemplified as the tray mechanism.

At the ejection position, the optical disc OD and the tray plate 510 are exposed to the air outside the housing 110 (hereafter called "external air"). If there is airborne dust in the external air, the dust may enter the housing 110 by the movement of the optical disc OD and the tray plate 510 from the ejection position to the storage position. The dust entering into the housing 110 may adhere to the objective lens. The cleaning techniques of this embodiment may effectively remove the dust from the objective lens.

Figure 4:
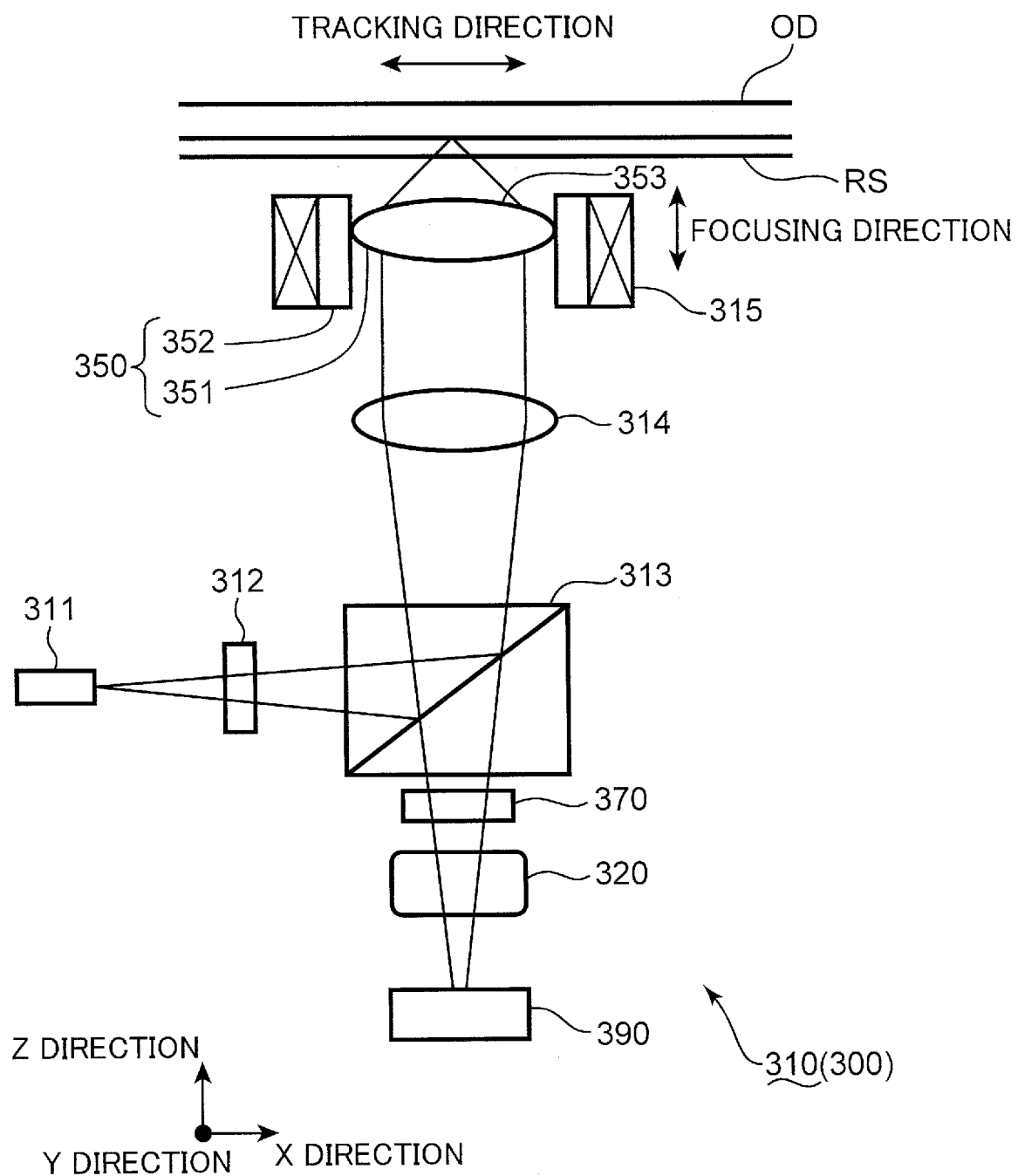
FIG. 4 is a schematic view of an exemplary optical head of an optical driver of the optical disc apparatus in FIG. 1.

FIG. 4 is a schematic view of an exemplary optical head 310 of the optical driver 300. The optical head 310 is described with reference to FIG. 4. The objective lens is denoted with the reference numeral "351".

The optical head 310 includes a semiconductor laser 311, a relay lens 312, a beam splitter 313, a collimate lens 314, an objective lens unit 350, an actuator 315, a hologram element 370, a cylindrical lens 320 and a photo-detector 390. The semiconductor laser 311 functions as a light source and emits a laser beam toward the relay lens 312. The laser beam passes through the relay lens 312 and enters the beam splitter 313. The beam splitter 313 reflects the laser beam toward the collimate lens 314. The laser beam then passes through the collimate lens 314 and reaches the objective lens unit 350.

The laser beam arriving at the objective lens unit 350 is then emitted toward the optical disc OD. The optical disc OD reflects or diffracts the laser beam. In the following description, the reflected or diffracted laser beam is called "reflected light".

The reflected light passes through the objective lens unit 350 and the collimate lens 314, and then enters the beam splitter 313 again. Since the beam splitter 313 allows passage of the reflected light, the reflected light passes through the hologram element 370 and the cylindrical lens 320, and eventually reaches the photo-detector 390.

The objective lens unit 350 faces the optical disc OD. The objective lens unit 350 includes the objective lens 351. The laser beam reflected by the beam splitter 313 and the reflected light from the optical disc OD pass through the objective lens 351.

The objective lens unit 350 further includes a lens holder 352 configured to hold the objective lens 351. The objective lens 351 is stored in the lens holder 352.

The objective lens 351 includes a facing surface 353 which faces the optical disc OD. The optical disc OD includes a recording surface RS which faces the facing surface 353. The recording surface RS receives light emitted from the facing surface 353. The reflected light from the recording surface RS passes through the objective lens 351. Information is optically processed between the facing surface 353 and the recording surface RS. Recording signals onto the recording surface RS and reproducing signals from the recording surface RS are exemplified as the optical information process. In this embodiment, the recording surface RS is exemplified as the processing surface.

As described above, the semiconductor laser 311 is used as a light source. The semiconductor laser 311 emits a laser beam toward the relay lens 312. The relay lens 312 finely adjusts a focal length between the semiconductor laser 311 and the relay lens 312. The laser beam passing through the relay lens 312 is reflected toward the collimate lens 314 by the beam splitter 313. The collimate lens 314 collimates the laser beam into collimated beam. The collimated beam then enters the objective lens unit 350.

The laser beam entering the objective lens unit 350 is condensed toward the recording surface RS of the optical disc OD by the objective lens 351. The optical head 310 may use the condensed light onto the recording surface RS to record signals on the recording surface RS of the optical disc OD. Alternatively, the optical head 310 may use the condensed light onto the recording surface RS to read signals recorded on the recording surface RS. The light reflected by the recording surface RS becomes the reflected light. The reflected light enters the objective lens unit 350. The signals recorded on the recording surface RS are reproduced by the reflected light.

The actuator 315 drives the objective lens unit 350 in the focusing direction (optical axis direction) and the tracking direction (radial direction). The actuator 315 may move the objective lens unit 350 in the focusing direction to appropriately adjust a distance between the recording surface RS and the facing surface 353. The actuator 315 may move the objective lens unit 350 in the tracking direction to scan the recording surface RS. Consequently, signals may be recorded onto and/or reproduced from the entire recording surface RS.

The reflected light from the recording surface RS of the optical disc OD passes through the objective lens unit 350 and the collimate lens 314, and then enters the beam splitter 313. The beam splitter 313 allows passage of the reflected light.

The reflected light passing through the beam splitter 313 enters the hologram element 370. The hologram element 370 causes tracking error signals in response to the one-beam tracking method (advanced push-pull (APP) method).

The reflected light passing through the hologram element 370 reaches the cylindrical lens 320. The reflected light passing through the cylindrical lens 320 enters the photo-detector 390.

Figure 5:
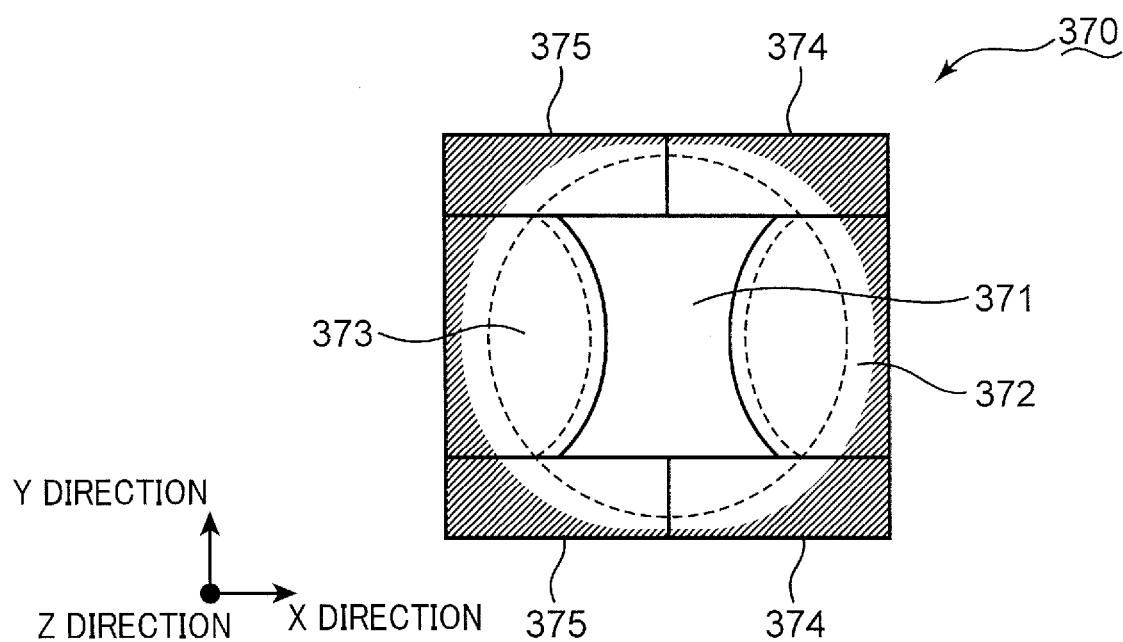
FIG. 5 is a schematic view of a hologram element of the optical head in FIG. 4.

FIG. 5 is a schematic view of the hologram element 370. The hologram element 370 is described with reference to FIGS. 4 and 5.

The solid lines drawn in the hologram element 370 in FIG. 5 schematically show a divisional pattern of the hologram element 370. The dotted lines in the hologram element 370 in FIG. 5 schematically show a shape (cross-section) of a laser beam passing through the hologram element 370.

The hologram element 370 is divided into a main beam area 371 at the center, APP main areas 372, 373, which are situated to the left and right of the main beam area 371, respectively, two APP sub-areas 374, which are situated above and below the APP main area 372, respectively, and two APP sub-areas 375, which are situated above and below the APP main area 373, respectively. Interference light of the ±first order light and 0 order light, which are diffracted by the recording surface RS of the optical disc OD, enter the APP main areas 372, 373. Only the 0-order light enters the APP sub-areas 374, 375.

Figure 6:
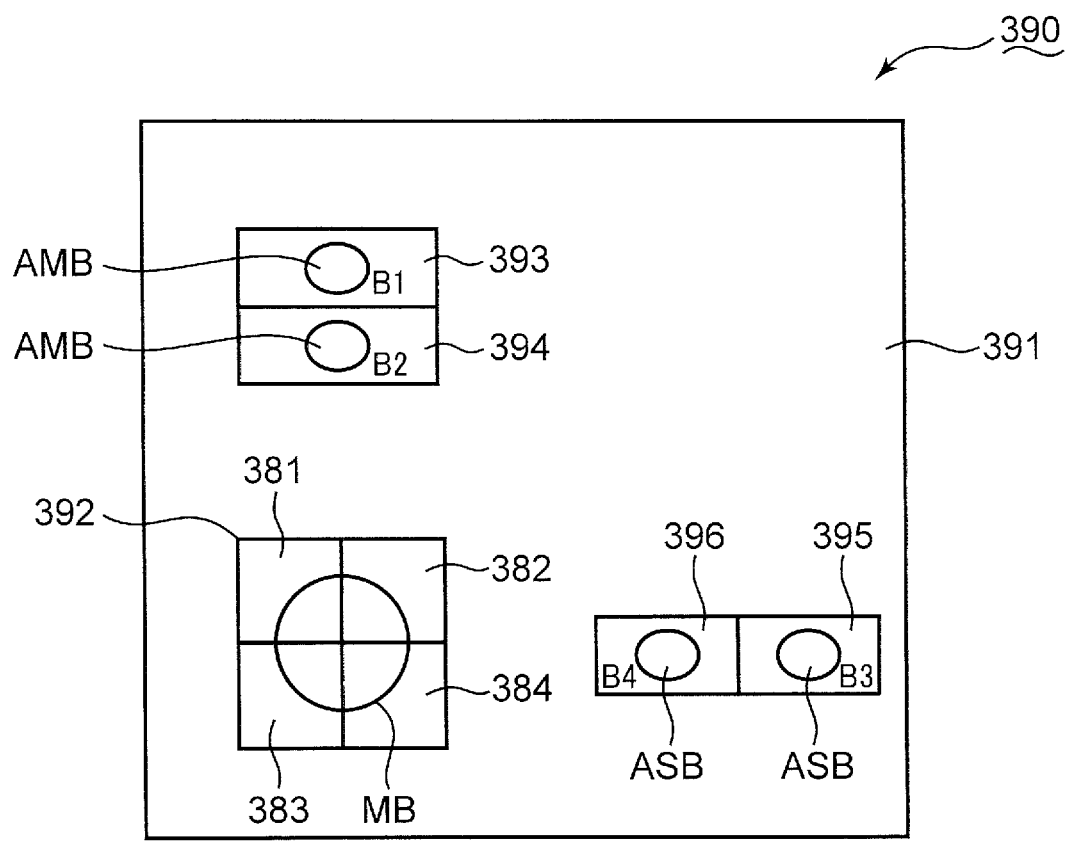
FIG. 6 is a schematic view of a photo-detector of the optical head in FIG. 4.

FIG. 6 is a schematic view of the photo-detector 390. A relationship between the hologram element 370 and the photo-detector 390 is described with reference to FIGS. 4 to 6.

The photo-detector 390 includes a light receiving surface 391 which faces the hologram element 370. The light receiving surface 391 includes a quartered photo-receptive area 392, APP main photo-receivers 393, 394 and APP sub-photo-receivers 395, 396. The laser beam passing through the main beam area 371 of the hologram element 370 enters the quartered photo-receptive area 392. In the following description, the laser beam passing through the main beam area 371 is called the "main beam MB". The laser beams passing through the APP main areas 372, 373 enter the APP main photo-receivers 393, 394, respectively. The laser beams passing through the APP main areas 372, 373 are denoted with the reference symbol "AMB" in FIG. 6. The laser beams passing through the APP sub-areas 374, 375 enter the APP sub-photo-receivers 395, 396. The laser beams passing through the APP sub-areas 374, 375 are denoted with the reference symbol "ASB" in FIG. 6.

The quartered photo-receptive area 392 includes a first area 381, a second area 382, which is situated on the right of the first area 381, a third area 383, which is situated below the first area 381, and a fourth area 384, which is situated below the second area 382. Focus error signals is generated on the basis of a difference between sum signals of signals generated in response to light detected in the first area 381 and signals generated in response to light detected in the fourth area 384, and sum signals of signals generated in response to light detected in the second area 382 and signals generated in response to light detected in the third area 383. RF signals are generated on the basis of a sum total of the signals generated in response to the light detected in the first area 381, the signals generated in response to the light detected in the second area 382, the signals generated in response to the light detected in the third area 383, and the signals generated in response to the light detected in the fourth area 384.

Push-pull signals are generated on the basis of a difference between the signals generated in response to light detected by each of the APP main photo-receivers 393, 394. Tracking error signals according to the APP method (advanced push-pull method) are generated by a predetermined operation using the push-pull signals and the signals generated in response to light detected by each of the APP sub-photo-receivers 395, 396. The objective lens unit 350 traces tracks of the recording surface RS of the optical disc OD under the tracking servo control using the tracking error signals.

Figure 7:
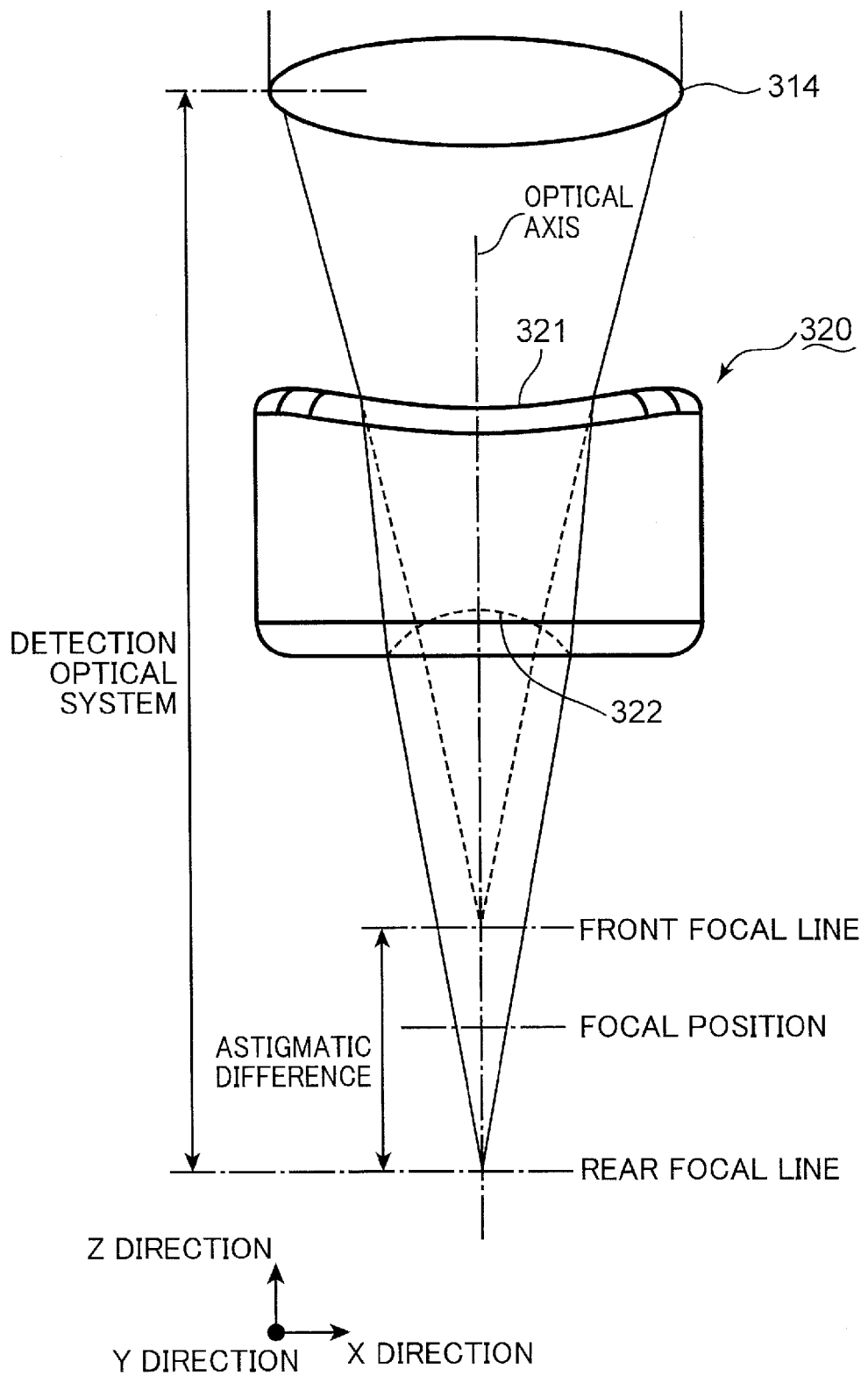
FIG. 7 is a schematic view of a cylindrical lens of the optical head in FIG. 4.

FIG. 7 is a schematic view of the cylindrical lens 320. The cylindrical lens 320 is described with reference to FIGS. 6 and 7.

The cylindrical lens 320 includes a concave lens surface 321, which faces the collimate lens 314, and a cylindrical surface 322 opposite to the concave lens surface 321. The cylindrical surface 322 generates an astigmatic difference, which is defined by a front focal line and a rear focal line on a plane orthogonal to the optical axis. The cylindrical lens 320 forms a focal point between the front and rear focal lines. The cylindrical surface 322 is inclined by approximately 45° from the quartered photo-receptive area 392 of the photo-detector 390.

Figure 8:
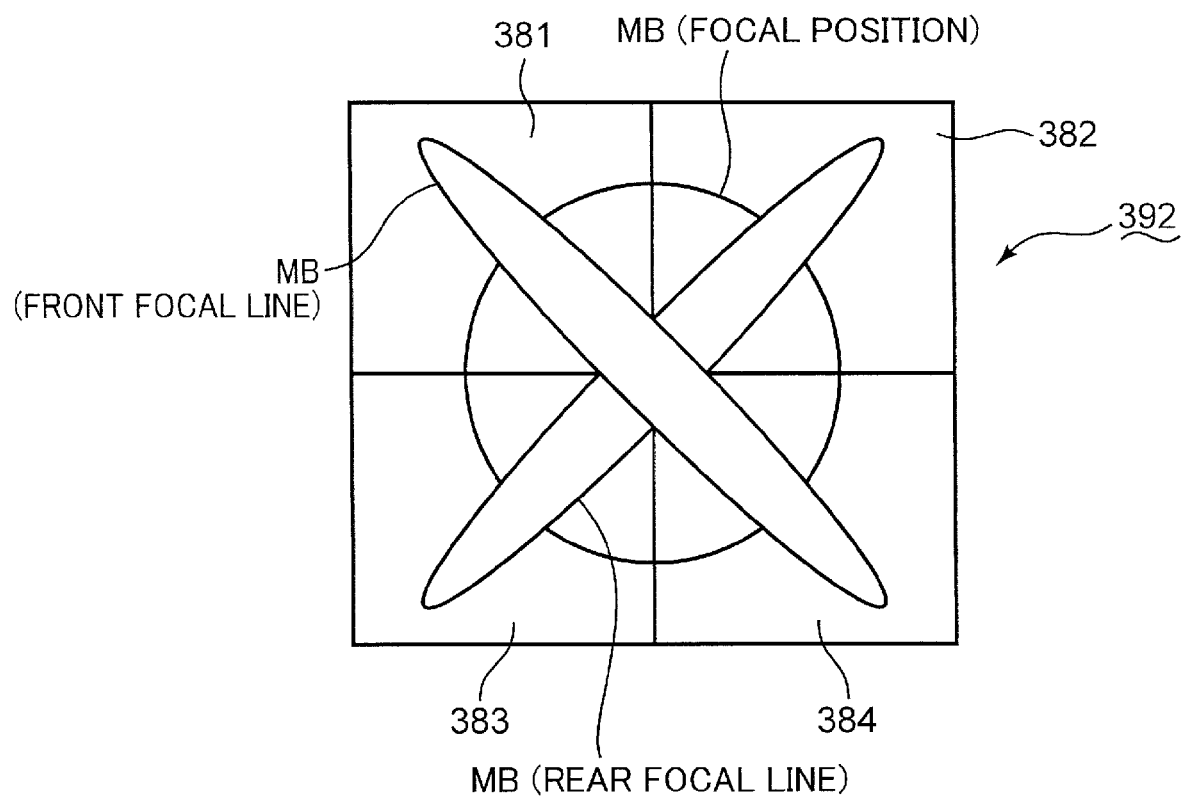
FIG. 8 is a schematic view of a quartered photo-receptive area of the optical head in FIG. 4.

FIG. 8 is a schematic view of the quartered photo-receptive area 392. The quartered photo-receptive area 392 is described with reference to FIGS. 4, 6 to 8.

The photo-detector 390 is positioned so that the quartered photo-receptive area 392 matches with the focal position. If the quartered photo-receptive area 392 matches with the focal position, the main beam MB on the quartered photo-receptive area 392 is substantially circular, as shown in FIG. 8.

If the recording surface RS is vibrated in the focusing direction by the rotation of the optical disc OD, a relative distance between the recording surface RS and the objective lens unit 350 fluctuates. As a result of the fluctuation of the relative distance between the recording surface RS and the objective lens unit 350, the quartered photo-receptive area 392 may match with the front or rear focal line. If the quartered photo-receptive area 392 matches with the front focal line, the main beam MB becomes an approximate ellipse extending between the first and fourth areas 381, 384 as shown in FIG. 8. If the quartered photo-receptive area 392 matches with the rear focal line, the main beam MB becomes an approximate ellipse extending between the second and third areas 382, 383 as shown in FIG. 8.

Figure 9:
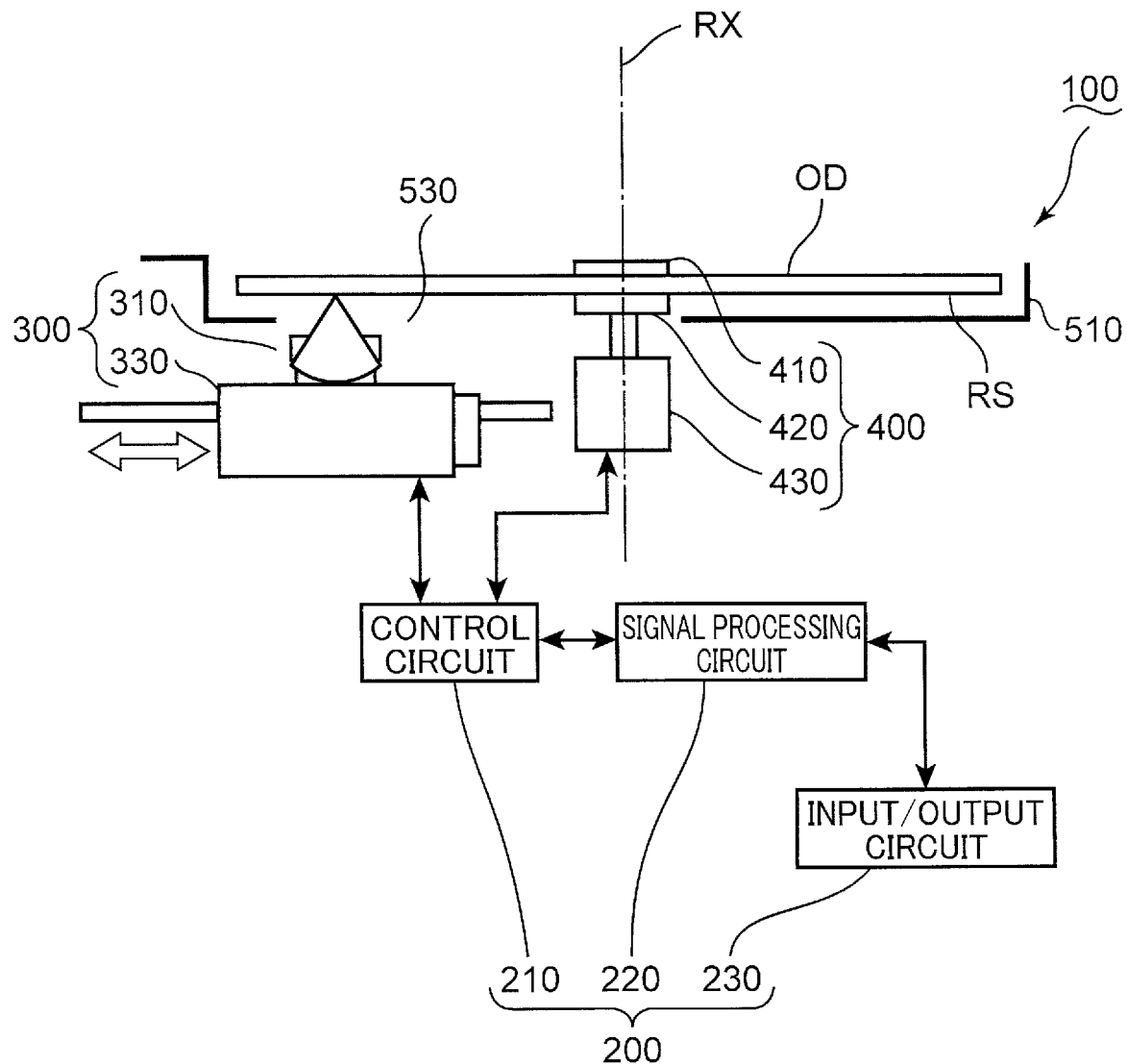
FIG. 9 is a schematic view of the optical disc apparatus in FIG. 1.

FIG. 9 is a schematic view showing the optical disc apparatus 100. The optical disc apparatus 100 is described with reference to FIGS. 1, 4, 6 and 9.

The optical driver 300 further includes a traverser 330 configured to move the optical head 310 in the tracking direction. The optical head 310 is mounted on the traverser 330. The traverser 330 moves the optical head 310 along the recording surface RS between an inner position, at which the optical head 310 faces the recording surface RS of the optical disc OD near the rotational axis RX of the optical disc OD, and an outer position, at which the optical head 310 faces the recording surface RS in a position more distant from the rotational axis RX than the inner position. Accordingly, a point of light (light emitted from the optical head 310) on the recording surface RS moves between the inner and outer positions. In this embodiment, the traverser 330 is exemplified as the first displacement mechanism. The inner position is exemplified as the first position. The outer position is exemplified as the second position. The rotational axis RX is exemplified as the rotational center.

The disc driver 400 includes a clamper 410, a turntable 420 and a spindle motor 430. The optical disc OD situated at the storage position by the tray plate 510 is held between the clamper 410 and the turntable 420. The spindle motor 430 is connected to the turntable 420. The turntable 420 is rotated by the spindle motor 430. Accordingly, the optical disc OD rotates on the tray plate 510.

The controller 200 further includes a control circuit 210, a signal processing circuit 220 and an input/output circuit (hereafter called "I/O circuit 230"). As described above, the optical head 310 generates various signals in response to the reflected light from the optical disc OD. The optical head 310 outputs the generated signals to the control circuit 210. The control circuit 210 executes various kinds of control such as focus control, tracking control, traverse control and rotation control for the spindle motor 430 in response to the signals from the optical head 310. These kinds of control may be control used for conventional optical information process techniques. The optical head 310 generates reproduction signals in response to the reflected light from the optical disc OD. The reproduction signals are output to the signal processing circuit 220 via the control circuit 210. The signal processing circuit 220 reproduces information in response to the reproduction signals. Signals containing the information reproduced by the signal processing circuit 220 are output to the I/O circuit 230. These reproduction processing operations may be reproduction techniques used for conventional optical processing techniques. The I/O circuit 230 may receive signals, which contain information to be recorded onto the optical disc OD, from an external device (not shown). The signals input to the I/O circuit 230 are then output to the optical head 310 via the signal processing circuit 220 and the control circuit 210. The optical head 310 may write the information onto the optical disc OD in response to the signals input to the I/O circuit 230. These writing techniques may be recording techniques used for conventional optical processing techniques.

Figure 10:
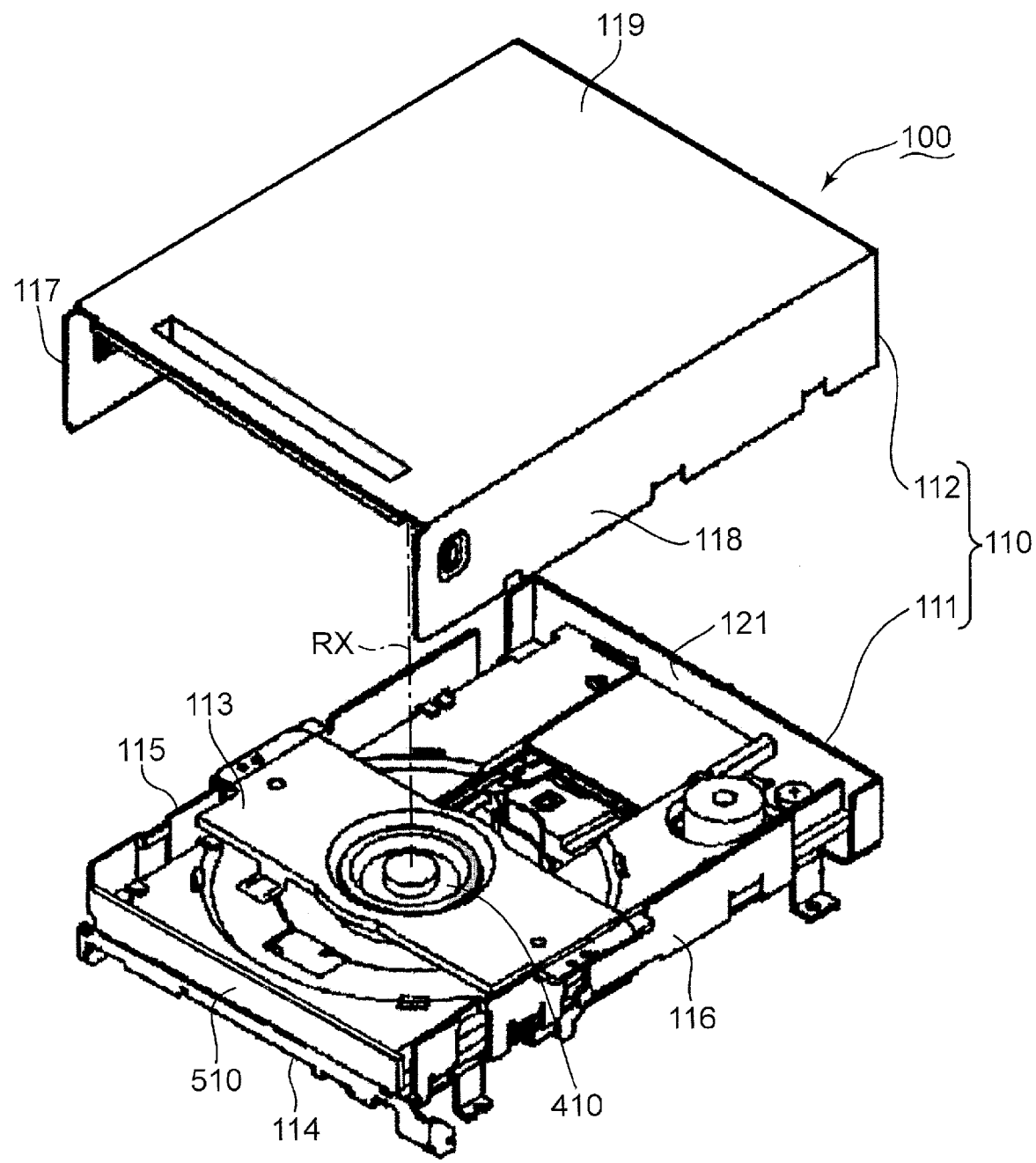
FIG. 10 is a schematic exploded perspective view of the optical disc apparatus in FIG. 1.

FIG. 10 is a schematic exploded perspective view of the optical disc apparatus 100. The optical disc apparatus 100 is described with reference to FIGS. 1, 9 and 10.

The housing 110 includes a support frame 111 and an outer case 112. The controller 200, the optical driver 300, the disc driver 400 and the tray driver 500 may be constructed on the support frame 111. The outer case 112 covers the controller 200, the optical driver 300, the disc driver 400 and the tray driver 500 constructed on the support frame 111.

The housing 110 further includes a holding plate 113 configured to hold the clamper 410. The support frame 111 includes a bottom plate 114 configured to support the tray plate 510, a left interior plate 115, which is upright from the left edge of the bottom plate 114, a right interior plate 116, which is upright from the right edge of the bottom plate 114, and a back plate 121, which stands between the left and right interior plates 115, 116. The holding plate 113 extends between the left and right interior plates 115, 116 at a position corresponding to the rotational axis RX.

The outer case 112 includes a left exterior plate 117, which is situated to the left of the left interior plate 115, a right exterior plate 118, which is situated to the right of the right interior plate 116, and the upper plate 119, which is situated between the left and right exterior plates 117, 118 so as to face the tray plate 510. The clamper 410 moves upward and downward between the upper plate 119 and the holding plate 113. The mechanism to move the clamper 410 up and down may be the same as a clamp structure included in a conventional device configured to perform information process on a BD and a DVD.

When the clamper 410 moves downward, the optical disc OD is held between the turntable 420 and the clamper 410.

Figure 11:
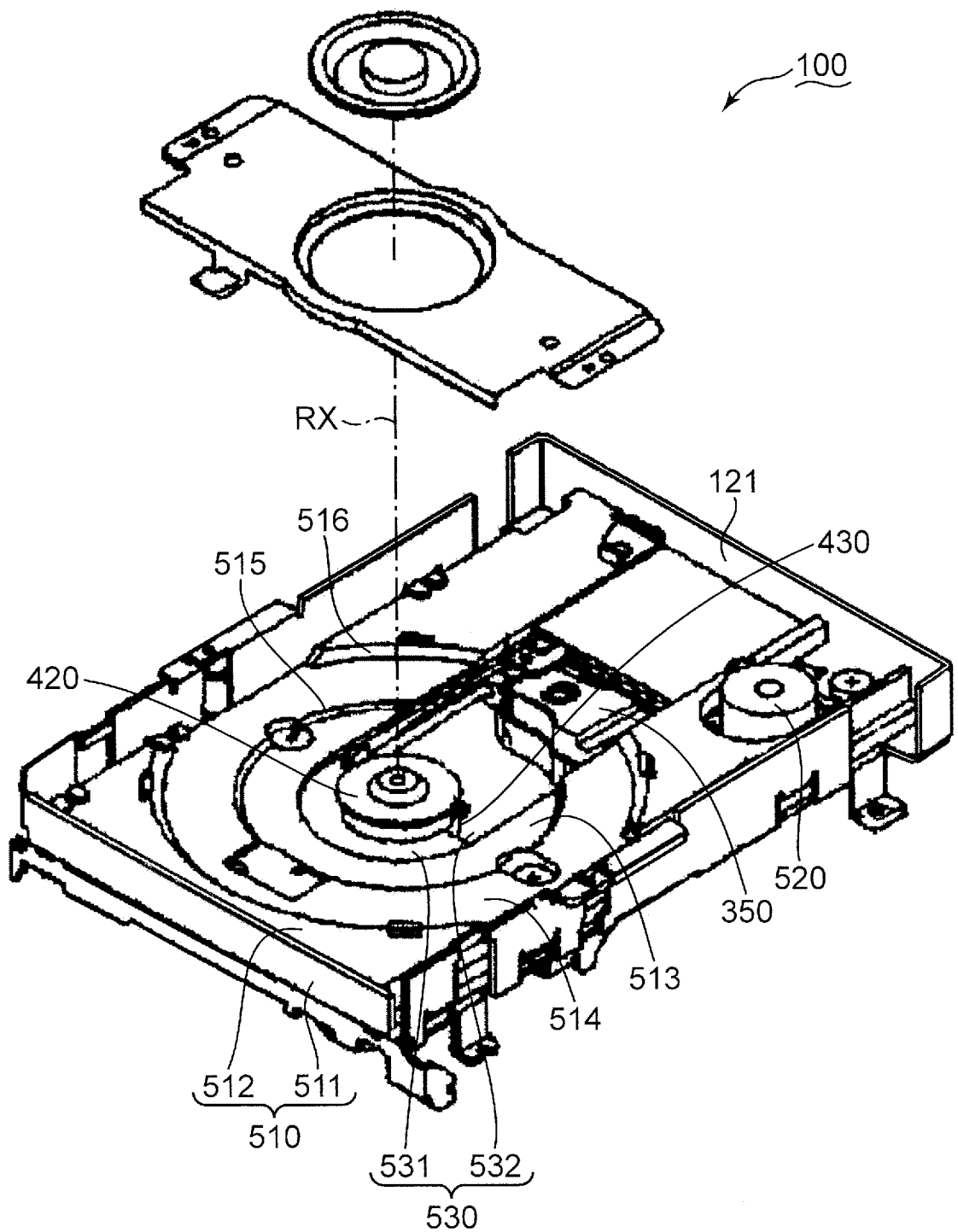
FIG. 11 is a schematic exploded perspective view of the optical disc apparatus in FIG. 1.

FIG. 11 is a schematic exploded perspective view of the optical disc apparatus 100. The optical disc apparatus 100 is described with reference to FIGS. 2, 3, 9 and 11.

In FIG. 11, the loading mechanism is denoted with the reference numeral "520". The loading mechanism 520 displaces the tray plate 510 between the storage position (c.f. FIG. 2) and the ejection position (c.f. FIG. 3).

The tray plate 510 includes a front wall 511 opposite to the back plate 121, and a bottom wall 512 which extends from the front wall 511 to the back plate 121. The bottom wall 512 includes a support area 513 for supporting a small optical disc (not shown), and a support area 514 for supporting a large optical disc OD. The bottom wall 512 includes an annular upright surface 515 standing between the support areas 513, 514. The support area 513 and the annular upright surface 515 define a rotation space in which the small optical disc rotates. The bottom wall 512 includes an annular upright surface 516 standing along the periphery of the support area 514. The support area 514 and the annular upright surface 516 define a rotation space in which the large optical disc OD rotates.

An opening area 530 is formed on the bottom wall 512. The opening area 530 includes a substantially semicircular first opening area 531, of which center is the rotational axis RX, and a substantially rectangular second opening area 532, which extends from the first opening area 531 toward the back plate 121. The turntable 420 supported by the spindle motor 430 is situated in the opening area 530. Since the second opening area 532 extends in the moving direction of the tray plate 510, the tray plate 510 may be displaced between the storage position and the ejection position without any interference with the turntable 420.

The objective lens unit 350 is situated in the second opening area 532. The objective lens unit 350 is moved along the second opening area 532 by the traverser 330 (c.f. FIG. 9).

(Cleaning Principle)

Figure 12B:
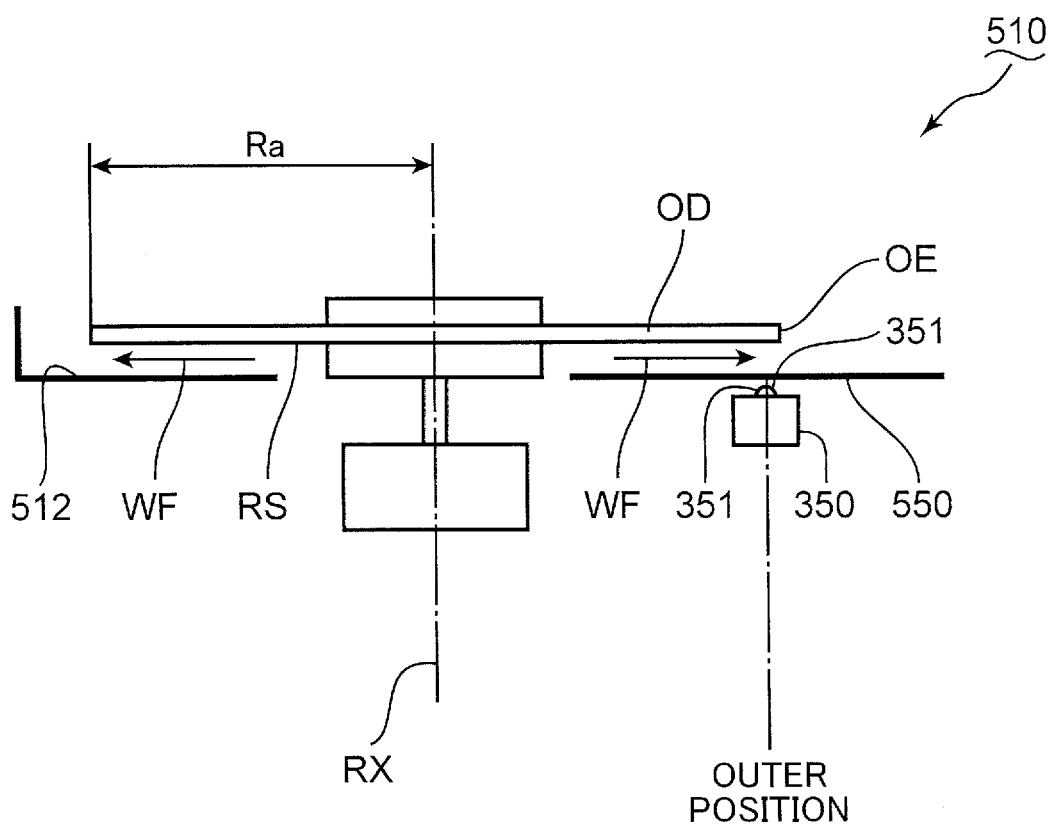
FIG. 12B is a schematic vertical cross-sectional view of the tray plate in FIG. 12A.
Figure 12C:
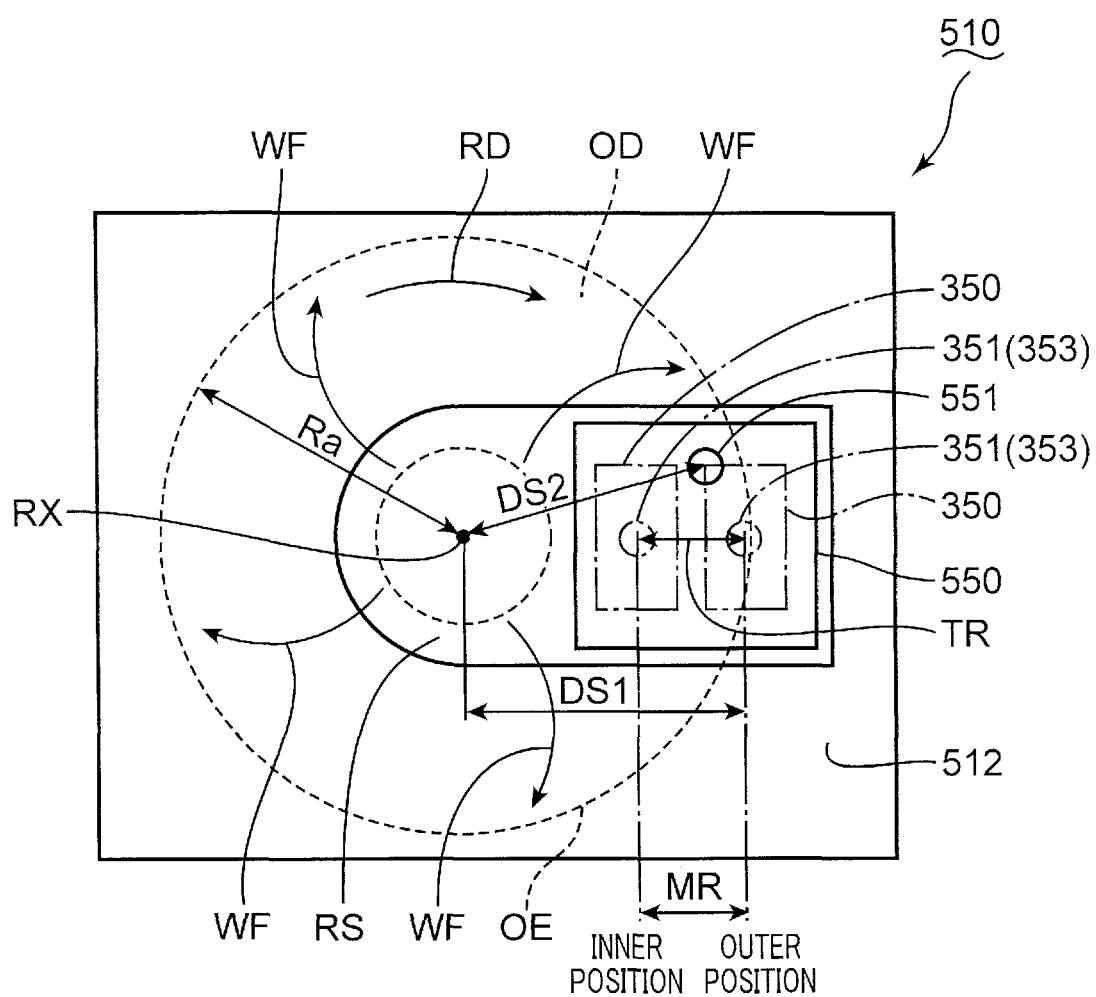
FIG. 12C is a schematic bottom view of the tray plate in FIG. 12A.

FIG. 12A is a schematic plan view of the tray plate 510. FIG. 12B is a schematic vertical cross-sectional view of the tray plate 510. FIG. 12C is a schematic bottom view of the tray plate 510. The cleaning principle is described with reference to FIGS. 1, 4, 9, 12A to 12C.

The tray driver 500 includes an opening piece 550. One opening 551 is formed in the opening piece 550. Alternatively, a plurality of openings may be formed in the opening piece. The principles of this embodiment are not limited by the number of openings. The opening 551 shown in FIGS. 12A to 12C is approximately circular. Alternatively, the opening may have another shape (e.g. ellipse, rectangle or triangle).

In FIGS. 12A to 12C, the arrow denoted with the reference symbol "RD" indicates a rotational direction of the optical disc OD. If the optical disc OD rotates, a swirling flow WF is generated between the bottom wall 512 and the recording surface RS. The swirling direction of the swirling flow WF is the same as the rotational direction RD of the optical disc OD. The principles of this embodiment are not limited by the rotational direction RD of the optical disc OD. Therefore, the optical disc OD may rotate clockwise or counterclockwise. In this embodiment, the swirling flow WF is exemplified as the air flow.

While the controller 200 executes the cleaning control, the opening piece 550 is situated between the objective lens unit 350 and the optical disc OD. Meanwhile, the opening piece 550 partially covers the opening area 530. Consequently, the swirling flow WF is less likely to flow from the opening area 530, the swirling flow WF intensively flows from the opening 551 formed in the opening piece 550. The opening piece 550 is situated so that the opening 551 is overlapped with the opening area 530. Therefore, the swirling flow WF flowing from the opening 551 is directly blown to the objective lens 351 without interference with the bottom wall 512.

In FIG. 12C, the objective lens unit 350 situated at the inner or outer position is indicated by the dashed line. Additionally, the movable range MR of the objective lens unit 350 is indicated in FIG. 12C. The inner and outer positions may be defined by the center of the facing surface 353 (c.f. FIG. 4) of the objective lens 351.

The swirling flow WF is strong at a position distant from the rotational axis RX than a position close to the rotational axis RX due to centrifugal action. Therefore, the traverser 330 (c.f. FIG. 9) may place the objective lens unit 350 at the outer position under control of the controller 200 while the controller 200 executes the cleaning control. If the opening 551 is positioned at a closer position to the outer position than the inner position, the objective lens 351 is exposed to the strong swirling flow WF.

The optical disc OD includes a periphery OE which defines the contour. If the objective lens 351 departs from the rotational axis RX beyond a distance Ra between the rotational axis RX and the periphery OE (i.e. beyond the optical disc OD), the swirling flow WF blown to the objective lens 351 may weaken. Therefore, the traverser 330 may allow the objective lens 351 to face the recording surface RS under control of the controller 200 while the controller 200 executes the cleaning control. Optionally, the objective lens 351 may depart from the rotational axis RX beyond the distance Ra. The principles of this embodiment are not limited by the position of the objective lens 351 with respect to the rotational axis RX, as long as the objective lens 351 is exposed to the strong swirling flow WF.

The position of the objective lens 351 while the controller 200 executes the cleaning control may be set so that the following condition is satisfied.

$$\frac{Ra}{2} \le \text{distance between objective lens and rotation axis} \le Ra \quad \text{[Formula 1]}$$

If the objective lens 351 is situated outside a circular area, of which radius around the rotational axis RX is ½ times as long as the distance Ra and inside a circular area, of which radius around the rotational axis RX is the length of the distance Ra, the objective lens 351 is exposed to the strong swirling flow WF blown from the opening 551.

FIG. 12C shows a track line TR which indicates a moving track of the objective lens 351 between the inner and outer positions. The opening 551 may be situated at the upstream of the track line TR in the rotational direction RD of the optical disc OD. Since the swirling direction of the swirling flow WF is the same as the rotational direction RD of the optical disc OD, the objective lens 351 is exposed to the strong swirling flow WF. In this embodiment, the opening 551 is exemplified as the upstream opening.

FIG. 12C shows a distance DS1 between the rotational axis RX and the center of the facing surface 353 of the objective lens 351, and a distance DS2 between the rotational axis RX and the center of the opening 551. The opening piece 550 is placed so that the distance DS2 is shorter than the distance DS1 is. The swirling flow WF flows outward from the rotational axis RX. Accordingly, the objective lens 351 is exposed to the strong swirling flow WF under this distance condition.

Figure 13A:
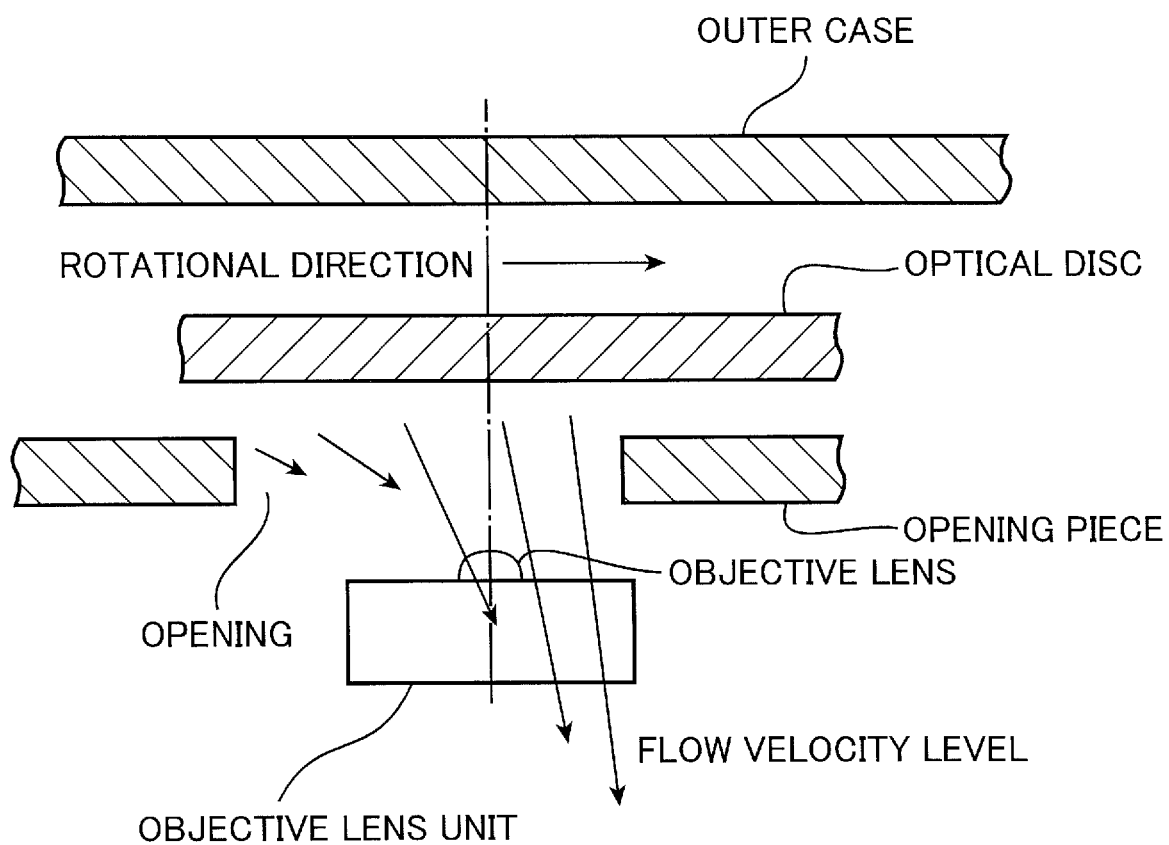
FIG. 13A is a schematic view of a model used for simulation about a swirling flow which is blown from an opening.
Figure 13B:
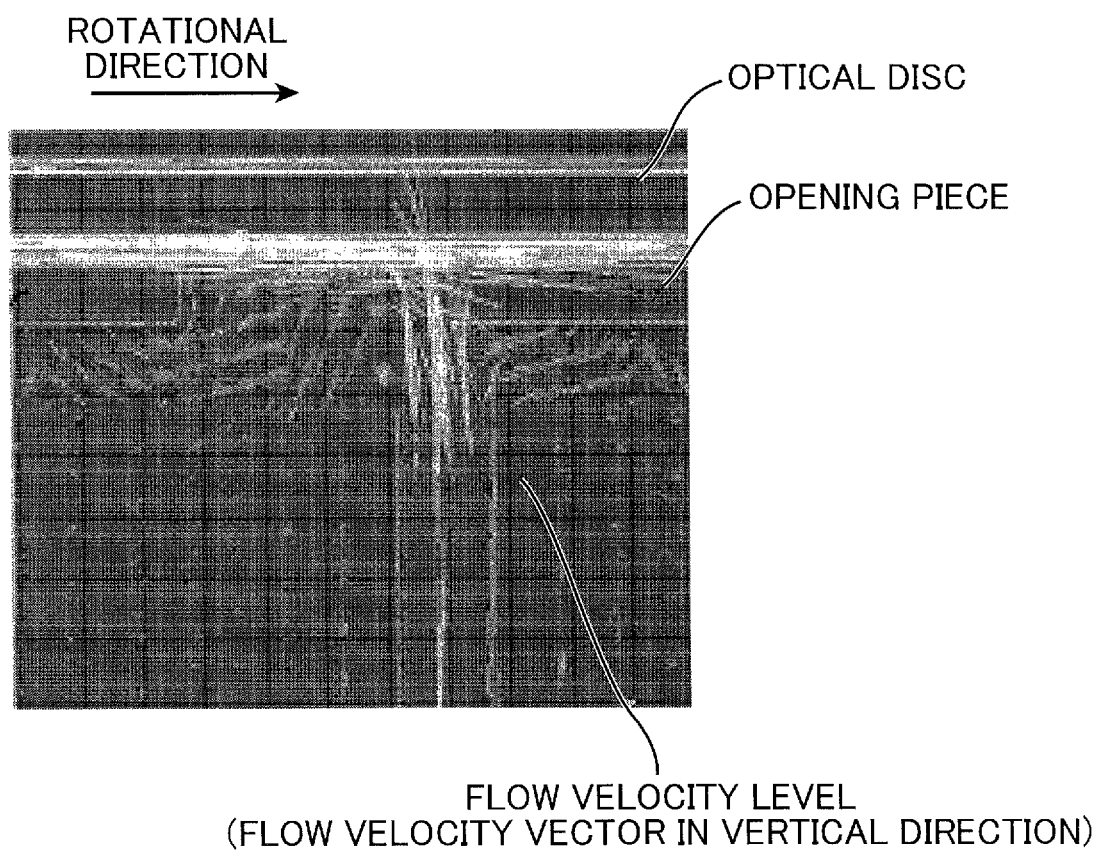
FIG. 13B is a vector diagram representing results of the simulation.

FIG. 13A is a schematic view of a model used for simulation of the swirling flow blown from the opening. FIG. 13B is a vector diagram representing results of the simulation. The swirling flow blown from the opening is described with reference to FIGS. 13A and 13B.

The dashed line in FIG. 13A is at a right angle to the moving track of the objective lens. The opening is shifted to the upstream side from the dashed line in the rotational direction of the optical disc. In short, the area of the opening on the upstream side of the dashed line is wider than the area of the opening on the downstream side of the dashed line. As shown in FIGS. 13A and 13B, the opening shifted upstream with respect to the objective lens may result in the swirling flow strongly hitting the objective lens. Consequently, dust is effectively removed from the objective lens.

Figure 14:
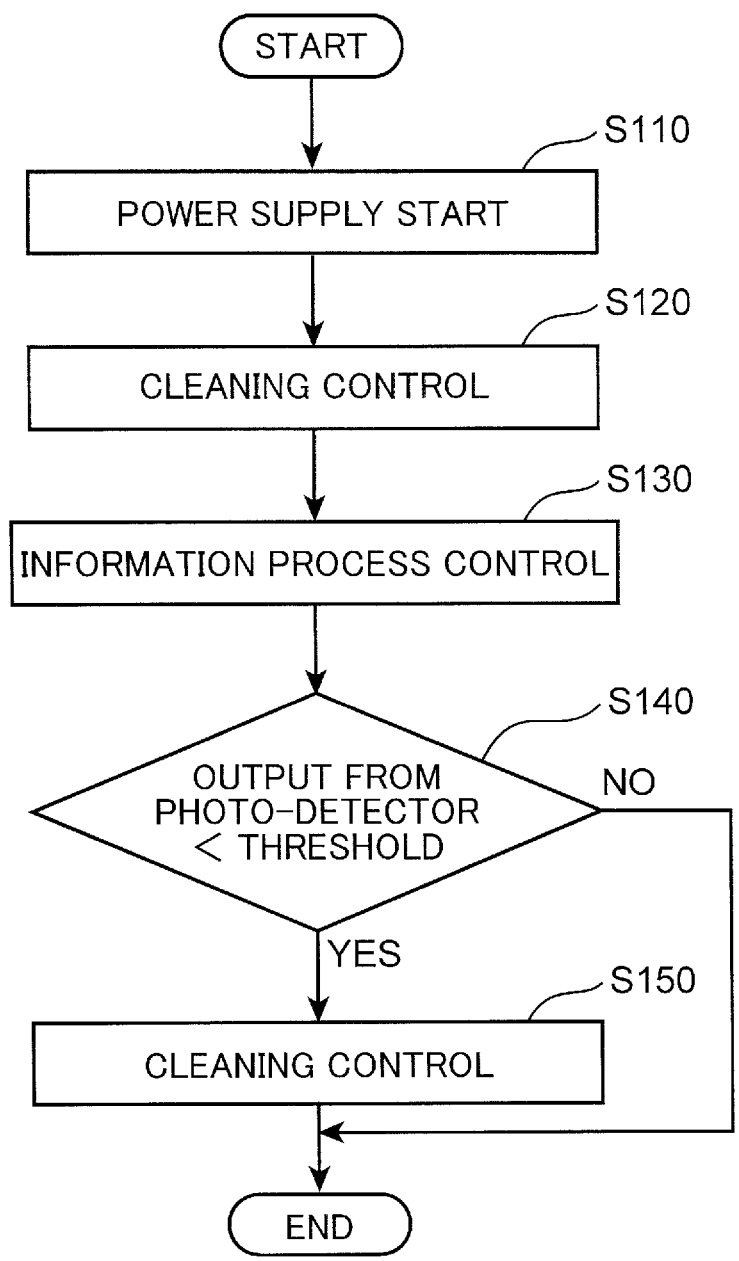
FIG. 14 is a schematic flowchart showing an exemplary operation of the optical disc apparatus in FIG. 1.

FIG. 14 is a schematic flowchart showing an exemplary operation of the optical disc apparatus 100. The operation of the optical disc apparatus 100 is described with reference to FIGS. 1, 4 and 14.

(Step S110)

In step S110, a user supplies power to the optical disc apparatus 100. Accordingly, the controller 200 starts control of the optical driver 300, the disc driver 400 and the tray driver 500. Then, step S120 is executed.

(Step S120)

In step S120, the controller 200 executes the cleaning control. The controller 200 controls the disc driver 400 to rotate the optical disc OD. The optical disc OD may be rotated at a faster rotational speed under the cleaning control than the information process control. If the opening piece 550 is mechanically displaced, the controller 200 may control the tray driver 500 to place the opening piece 550 between the objective lens 351 and the optical disc OD. Alternatively, the user may manually place the opening piece 550 between the objective lens 351 and the optical disc OD. The techniques to dispose the opening piece 550 are described in the following various embodiments. After the controller 200 executes the cleaning control for a while, step S130 is executed. Alternatively, step S130 may be executed when output signals from the photo-detector 390 exceed a predetermined threshold.

(Step S130)

In step S130, the controller 200 executes the information process control. Under the information process control, the optical disc apparatus 100 may perform an operation (recording and/or reproducing operation) similar to that of a conventional device configured to perform information process on a BD or DVD. If the opening piece 550 is mechanically displaced, the controller 200 controls the tray driver 500 to remove the opening piece 550 from the space between the objective lens 351 and the optical disc OD. When the information process control ends, step S140 is executed.

(Step S140)

In step S140, the controller 200 refers to output signals (e.g. S/N ratio) from the photo-detector 390 to determine whether the output signals are below a predetermined threshold. If the output signals are below the predetermined threshold, step S150 is executed. Otherwise the control ends.

(Step S150)

In step S150, the controller 200 executes the cleaning control. The operation of the optical disc apparatus 100 under the cleaning control may be the same as the operation of the optical disc apparatus 100 in step S120.

Second Embodiment

The cleaning techniques for the objective lens described in the context of the first embodiment may be applied to cleaning of a plurality of objective lenses. Cleaning techniques for a plurality of objective lenses according to the second embodiment are described.

Figure 15:
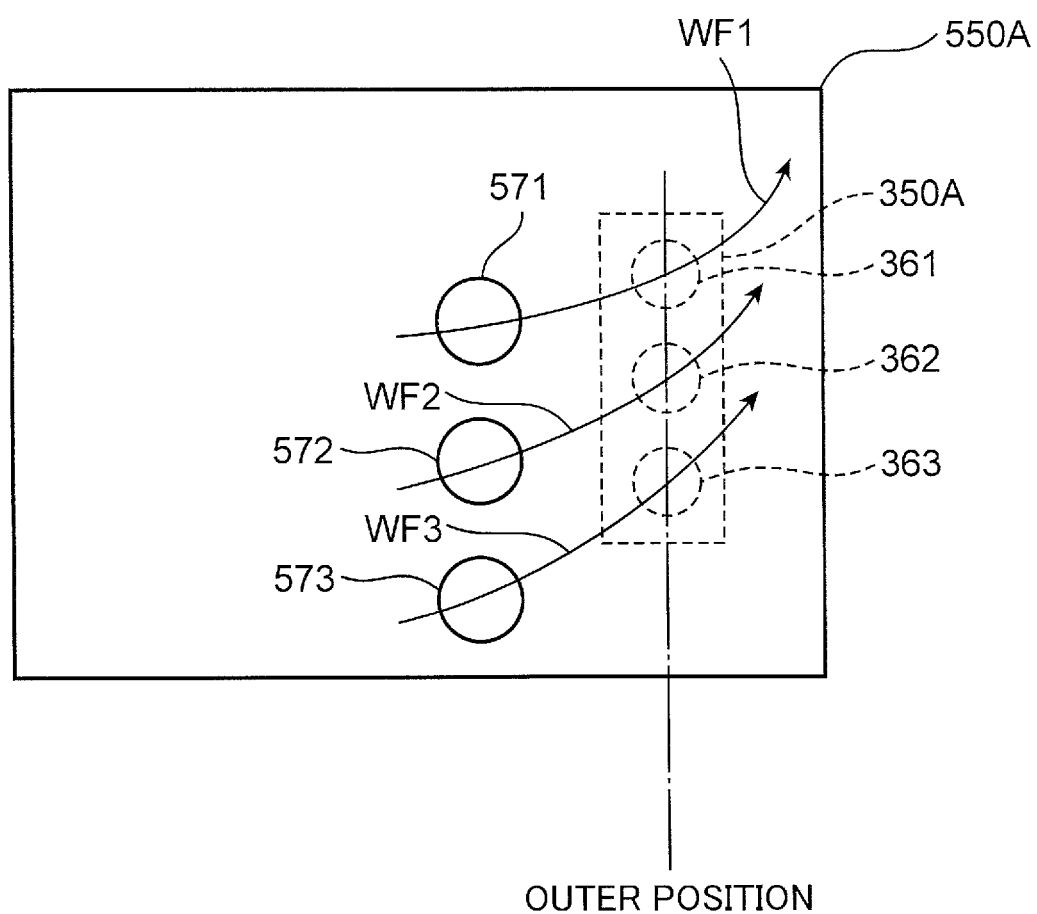
FIG. 15 is a schematic view showing a positional relationship between an opening piece and an objective lens unit situated below the opening piece (Second Embodiment).

FIG. 15 is a schematic view showing a positional relationship between an opening piece 550A and an objective lens unit 350A situated below the opening piece 550A. The opening piece 550A may be used instead of the opening piece 550 described in the context of the first embodiment. The objective lens unit 350A may be used instead of the objective lens unit 350 described in the context of the first embodiment.

The objective lens unit 350A includes three objective lenses 361, 362, 363. A laser beam having a substantially 780 nm wavelength may be emitted from the objective lens 361. A laser beam having a substantially 650 nm wavelength may be emitted from the objective lens 362. A laser beam having a substantially 405 nm wavelength may be emitted from the objective lens 363. The type of the laser beams emitted from the objective lens unit and the number of beams depend on the type of the optical disc to be used. In this embodiment, one of the objective lenses 361, 362, 363 is exemplified as the first objective lens. Another of the objective lenses 361, 362, 363 is exemplified as the second objective lens.

Three openings 571, 572, 573 are formed in the opening piece 550A. A position of the opening 571 is set so that a swirling flow WF1 blown from the opening 571 primarily hits the objective lens 361 situated at the outer position. A position of the opening 572 is set so that a swirling flow WF2 blown from the opening 572 primarily hits the objective lens 362 situated at the outer position. A position of the opening 573 is set so that a swirling flow WF3 blown from the opening 573 primarily hits the objective lens 363 situated at the outer position. The positions of the openings 571, 572, 573 are appropriately determined on the basis of the principles described in the context of the first embodiment. In this embodiment, one of the openings 571, 572, 573 is exemplified as the first opening. Another of the openings 571, 572, 573 is exemplified as the second opening.

Third Embodiment

The cleaning techniques for the objective lens described in the context of the first embodiment may be applied when an optical disc having two recording surfaces is used. Cleaning techniques for the optical disc having two recording surfaces according to the third embodiment are described.

Figure 16:
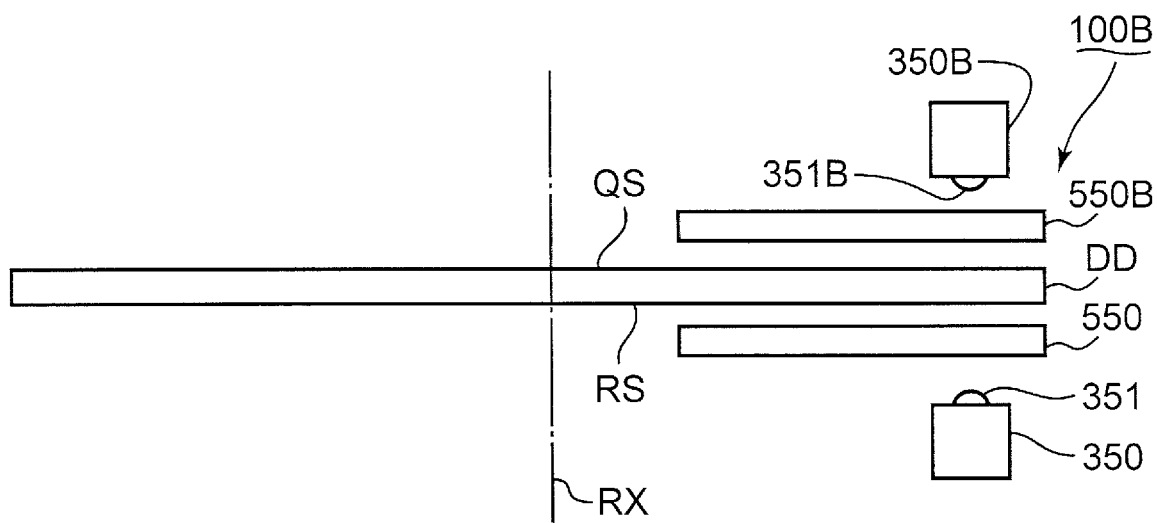
FIG. 16 is a schematic side view of an optical disc apparatus according to the third embodiment.

FIG. 16 is a schematic side view of an optical disc apparatus 100B. The optical disc apparatus 100B is described with reference to FIG. 16. The optical disc apparatus 100B may include all the elements described in the context of the first embodiment.

Like the optical disc OD described in the context of the first embodiment, an optical disc DD has the recording surface RS. The optical disc DD includes the additional recording surface QS opposite to the recording surface RS. Like the first embodiment, the objective lens unit 350 is used for recording information onto the recording surface RS and/or reproducing information from the recording surface RS. The opening piece 550 is used for cleaning the objective lens 351 of the objective lens unit 350.

The optical disc apparatus 100B further includes an additional objective lens unit 350B. The objective lens unit 350B has an objective lens 351B. The objective lens unit 350B is used for recording information onto the recording surface QS and/or reproducing information from the recording surface QS. The structure of the objective lens unit 350B and the mechanism to drive the objective lens unit 350B may be the same as the structure of the objective lens unit 350 and the mechanism for driving the objective lens unit 350, respectively.

The optical disc apparatus 100B further includes an additional opening piece 550B. Under the cleaning control, the opening piece 550B is situated between the objective lens unit 350B and the recording surface QS. The opening piece 550B may have the same structure as the opening piece 550.

The opening piece 550B is used for cleaning the objective lens 351B. The cleaning principle of the objective lens 351B using the opening piece 550B is the same as the cleaning principles described in the context of the first embodiment.

Fourth Embodiment

The cleaning techniques for the objective lens described in the context of the first embodiment uses a swirling flow. If a position of the objective lens is adjusted so that the swirling flow strongly hits the objective lens, dust on the objective lens is effectively removed. Techniques to adjust the position of the objective lens are described in this embodiment.

Figure 17:
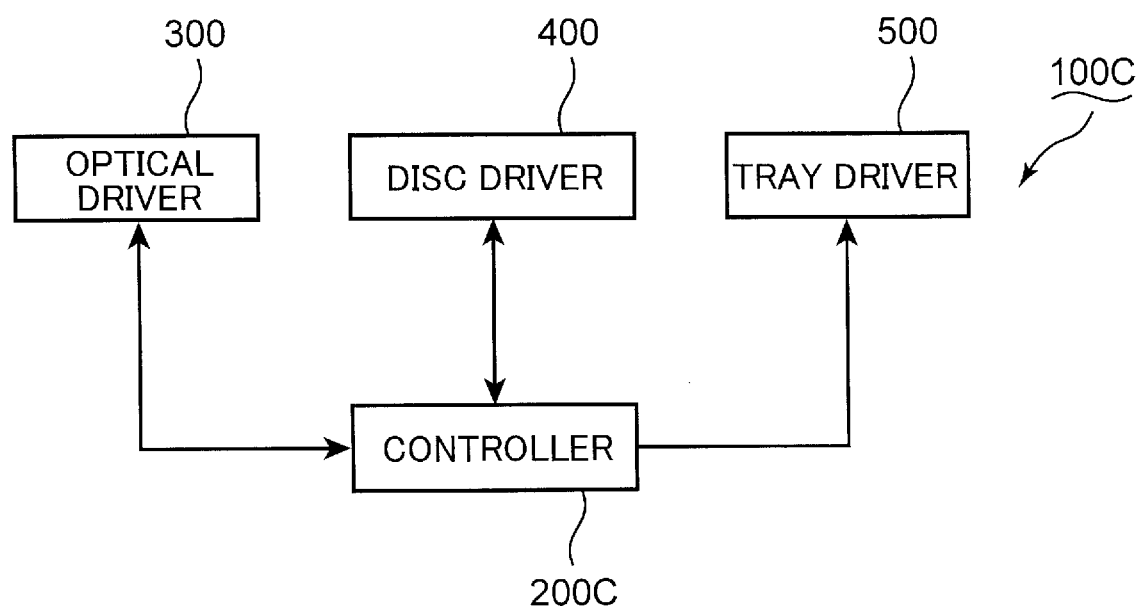
FIG. 17 is a schematic block diagram of an optical disc apparatus according to the fourth embodiment.

FIG. 17 is a schematic block diagram of an optical disc apparatus 100C. The optical disc apparatus 100C is described with reference to FIG. 17. The same components as the first embodiment are denoted with the same reference symbols. The description in the first embodiment is applicable to the components denoted with the same reference symbols.

Like the first embodiment, the optical disc apparatus 100C includes the optical driver 300, the disc driver 400 and the tray driver 500. The optical disc apparatus 100C further includes a controller 200C. The controller 200C controls the optical driver 300, the disc driver 400 and the tray driver 500.

Figure 18:
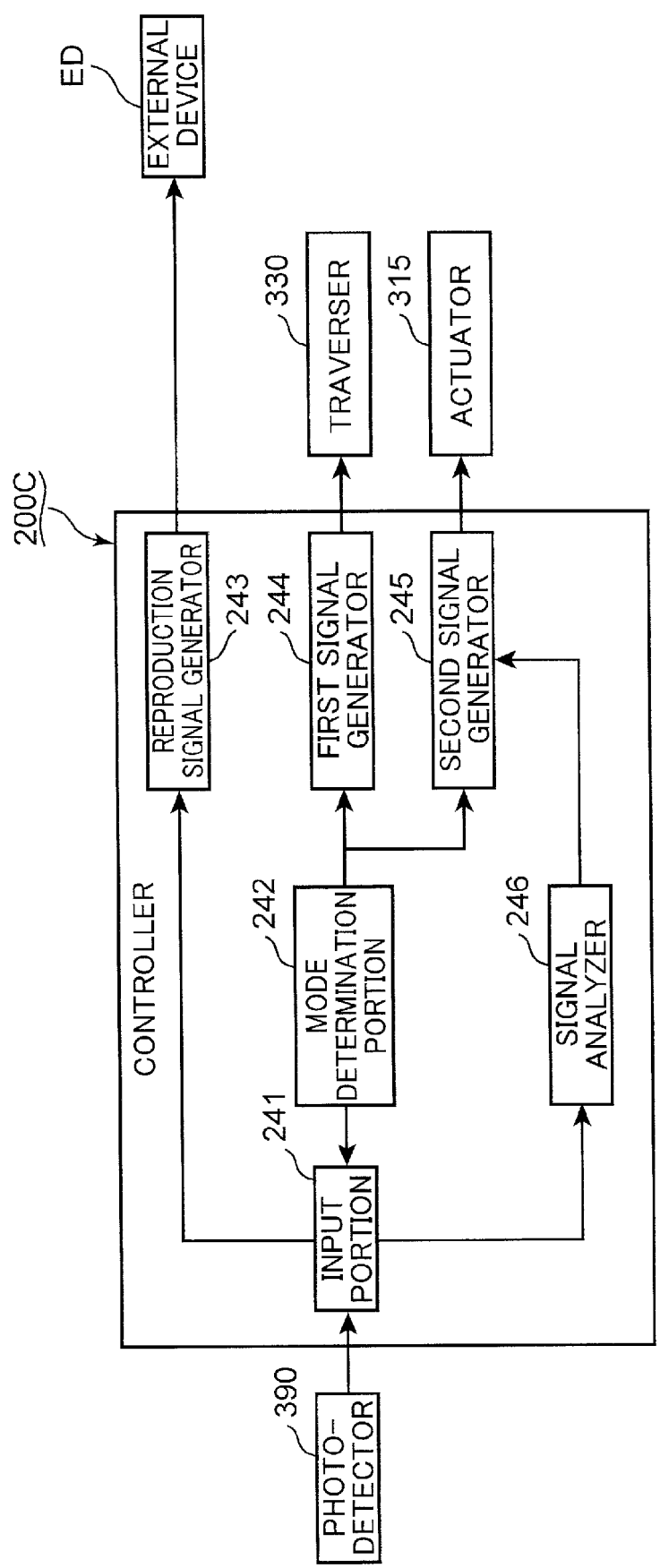
FIG. 18 is a schematic block diagram showing a functional configuration of a controller of the optical disc apparatus in FIG. 17.

FIG. 18 is a schematic block diagram showing a functional configuration of the controller 200C. The controller 200C is described with reference to FIGS. 4, 12C and 18.

The controller 200C includes an input portion 241, a mode determination portion 242, a reproduction signal generator 243, a first signal generator 244, a second signal generator 245 and a signal analyzer 246. As described in the context of the first embodiment, the photo-detector 390 generates electric signals in response to an amount of received light. The electric signals are output from the photo-detector 390 to the input portion 241. The mode determination portion 242 selects a control mode from the information process control and the cleaning control. In this embodiment, the photo-detector 390 is exemplified as the detector.

The mode determination portion 242 outputs information about the selected control mode to the input portion 241, the first and second signal generators 244, 245. If the mode determination portion 242 determines the information process control as the control mode, the input portion 241 sets the reproduction signal generator 243 as an output destination of the electric signals from the photo-detector 390. The reproduction signal generator 243 generates the reproduction signals in response to the electric signals from the input portion 241. The reproduction signals are output from the reproduction signal generator 243 to an external device ED (e.g. personal computer). The external device ED reproduces information recorded on the optical disc OD. Meanwhile, the first signal generator 244 generates first drive signals for driving the traverser 330. The first drive signals are output from the first signal generator 244 to the traverser 330. The traverser 330 displaces the objective lens unit 350 in the tracking direction in response to the first drive signals. If the mode determination portion 242 determines the information process control as the control mode, the second signal generator 245 generates second drive signals for driving the actuator 315. The second drive signals are output from the second signal generator 245 to the actuator 315. The actuator 315 displaces the objective lens 351 in the tracking and/or focusing directions in response to the second drive signals. In this embodiment, the actuator 315 is exemplified as the adjuster.

If the mode determination portion 242 selects the cleaning control as the control mode, the input portion 241 sets the signal analyzer 246 as an output destination of the electric signals from the photo-detector 390. If the mode determination portion 242 selects the cleaning control as the control mode, the first signal generator 244 generates first drive signals for positioning the objective lens unit 350 at the outer position (c.f. FIG. 12C). The first drive signals are output from the first signal generator 244 to the traverser 330. The traverser 330 positions the objective lens unit 350 at the outer position in response to the first drive signals.

After the objective lens unit 350 is positioned at the outer position by the traverser 330, the second signal generator 245 generates second drive signals for displacing the objective lens 351 within a predetermined range in the tracking and/or focusing directions. The objective lens 351 is displaced within the predetermined range in the tracing and/or focusing directions in response to the second drive signals.

While the objective lens 351 is displaced in the tracking and/or focusing directions in response to the second drive signals, a magnitude and angle of a force which the objective lens 351 receives from the swirling flow WF fluctuates. If the objective lens 351 is situated at a position at which dust adhering to the objective lens 351 is effectively removed, an amount of light received by the photo-detector 390 increases.

While the objective lens 351 is displaced in the tracking and/or focusing directions in response to the second drive signals, the signal analyzer 246 may store data about an amount of light indicated by the electric signals output from the photo-detector 390 in association with a position of the objective lens 351. The signal analyzer 246 may detect a position of the objective lens 351 at which there is the largest increase in the light amount. The information about the position of the objective lens 351 at which there is the largest increase in the light amount may be output from the signal analyzer 246 to the second signal generator 245. The second signal generator 245 generates second drive signals for positioning the objective lens 351 at a position indicated by the information from the signal analyzer 246. The second drive signals are output from the second signal generator 245 to the actuator 315. The actuator 315 positions the objective lens 351 in response to the second drive signals. Accordingly, dust is effectively removed from the objective lens 351.

In this embodiment, the objective lens 351 is placed at a position at which the maximum amplitude of the light amount increase is detected. Alternatively, the objective lens 351 may be placed at a position at which there is the maximum increase rate of the light amount. Alternatively, the objective lens 351 may be placed at a position at which a predetermined change pattern of the light amount is detected.

Fifth Embodiment

The cleaning techniques for the objective lens described in the context of the first embodiment utilize a swirling flow. If another external force is applied to dust adhering to an objective lens in addition to a force from the swirling flow, the dust may be effectively removed from the objective lens. Techniques to apply the additional force to the dust are described in this embodiment.

Figure 19:
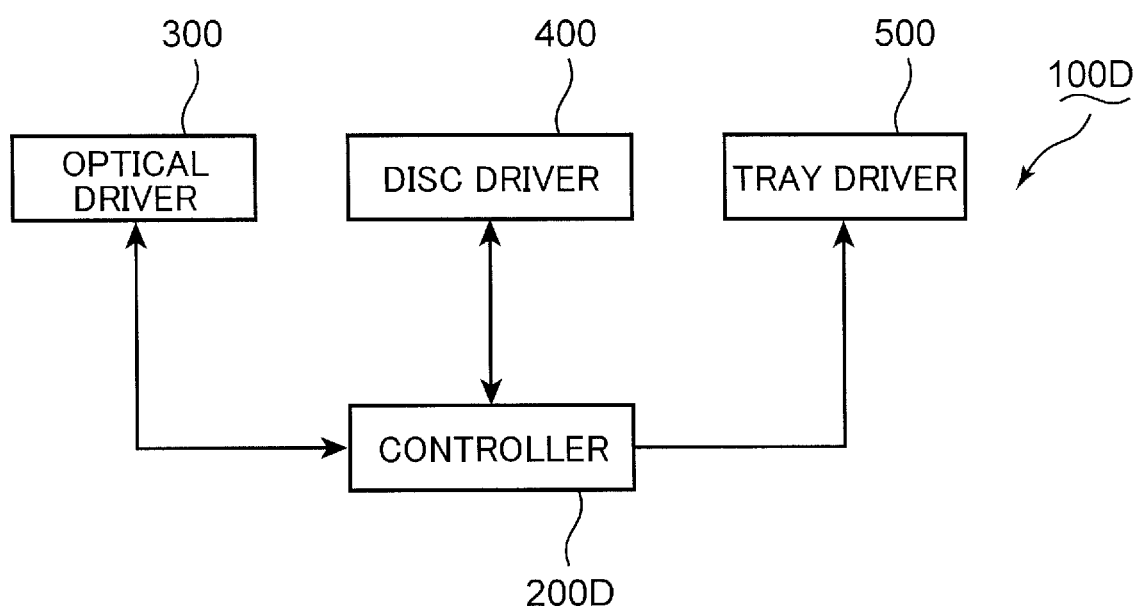
FIG. 19 is a schematic block diagram of an optical disc apparatus according to the fifth embodiment.

FIG. 19 is a schematic block diagram of an optical disc apparatus 100D. The optical disc apparatus 100D is described with reference to FIG. 19. The same components as the fourth embodiment are denoted with the same reference symbols. The description in the fourth embodiment is applicable to the components denoted with the same reference symbols.

Like the fourth embodiment, the optical disc apparatus 100D includes the optical driver 300, the disc driver 400 and the tray driver 500. The optical disc apparatus 100D further includes a controller 200D. The controller 200D controls the optical driver 300, the disc driver 400 and the tray driver 500.

Figure 20:
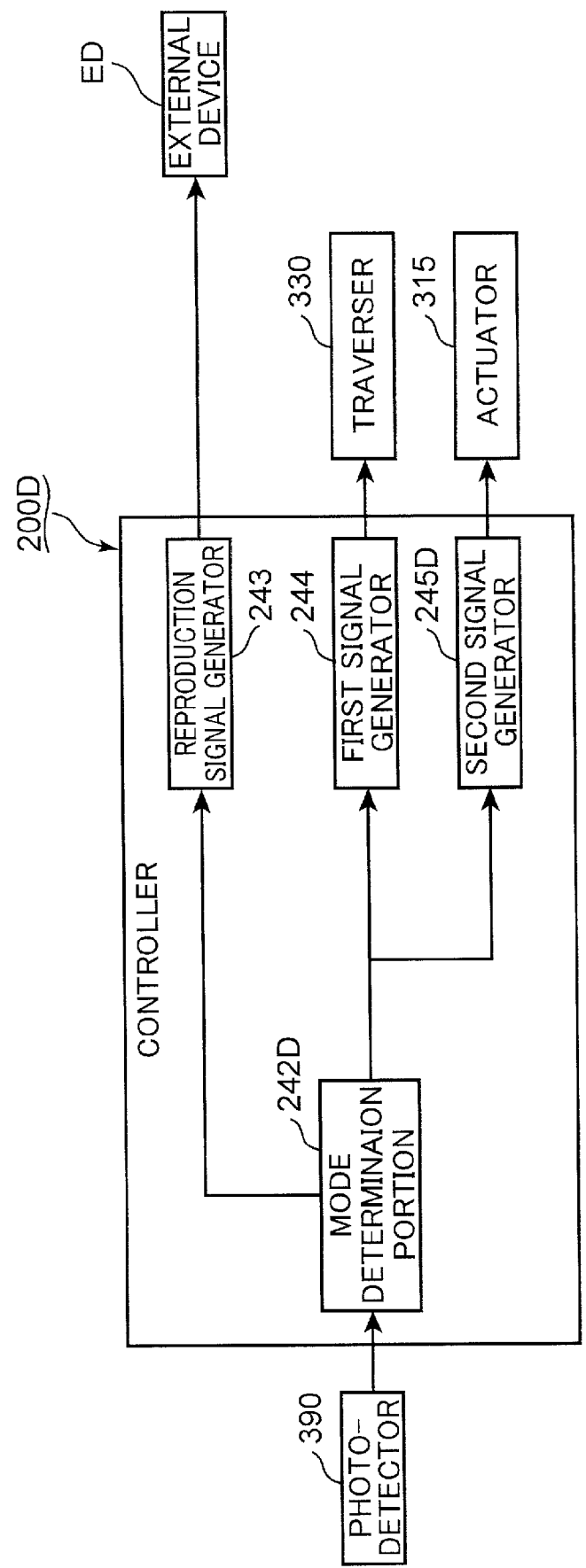
FIG. 20 is a schematic block diagram showing a functional configuration of a controller of the optical disc apparatus in FIG. 19.

FIG. 20 is a schematic block diagram showing a functional configuration of the controller 200D. The controller 200D is described with reference to FIGS. 4, 12C and 20.

Like the fourth embodiment, the controller 200D includes the reproduction signal generator 243 and the first signal generator 244. The controller 200D further includes a mode determination portion 242D and a second signal generator 245D.

The mode determination portion 242D outputs information about the selected control mode to the first and second signal generators 244, 245D. The photo-detector 390 generates electric signals in response to an amount of received light. The mode determination portion 242D which determines the information process as the control mode sets the reproduction signal generator 243 as an output destination of the electric signals from the photo-detector 390. The reproduction signal generator 243 generates reproduction signals in response to the electric signals from the mode determination portion 242D. The reproduction signals are output from the reproduction signal generator 243 to an external device ED (e.g. personal computer). The external device ED reproduces information recorded on the optical disc OD. Meanwhile, the first signal generator 244 generates first drive signals for driving the traverser 330. The first drive signals are output from the first signal generator 244 to the traverser 330. The traverser 330 displaces the objective lens unit 350 in the tracking direction in response to the first drive signals. If the mode determination portion 242D determines the information process control as the control mode, the second signal generator 245D generates second drive signals for driving the actuator 315. The second drive signals are output from the second signal generator 245D to the actuator 315. The actuator 315 displaces the objective lens 351 in the tracking and/or focusing directions in response to to the second drive signals.

The mode determination portion 242D which selects the cleaning control as the control mode stops output of the electric signals to the reproduction signal generator 243. Meanwhile, the mode determination portion 242 allows the first signal generator 244 to generate first drive signals for positioning the objective lens unit 350 at the outer position (c.f. FIG. 12C). The first drive signals are output from the first signal generator 244 to the traverser 330. The traverser 330 positions the objective lens unit 350 at the outer position in response to the first drive signals.

After the objective lens unit 350 is positioned at the outer position by the traverser 330, the mode determination portion 242D allows the second signal generator 245D to generate second drive signals for vibrating the objective lens 351 in the tracking and/or focusing directions. The actuator 315 vibrates the objective lens 351 in the tracking and/or focusing directions in response to the second drive signals. Dust adhering to the objective lens 351 receives an external force resultant from the vibration of the objective lens 351. Accordingly, the dust is likely to be removed from the objective lens 351. In this embodiment, the actuator 315 is exemplified as the vibrator.

Sixth Embodiment

The cleaning techniques for the objective lens described in the first embodiment use an opening piece to partially cover the opening area formed in the tray plate and intensify a swirling flow blown from the opening formed in the opening piece. Since the objective lens is exposed to the intensified swirling flow, dust is effectively removed from an objective lens. The opening area partially covered by the opening piece under the cleaning control is used for moving the objective lens under the information process control. Therefore, the opening piece may interrupt the optical information process using the objective lens if the opening piece covers the open area under the information process control. In this embodiment, techniques about an opening piece which causes timely coverage over the opening area are described.

Figure 21:
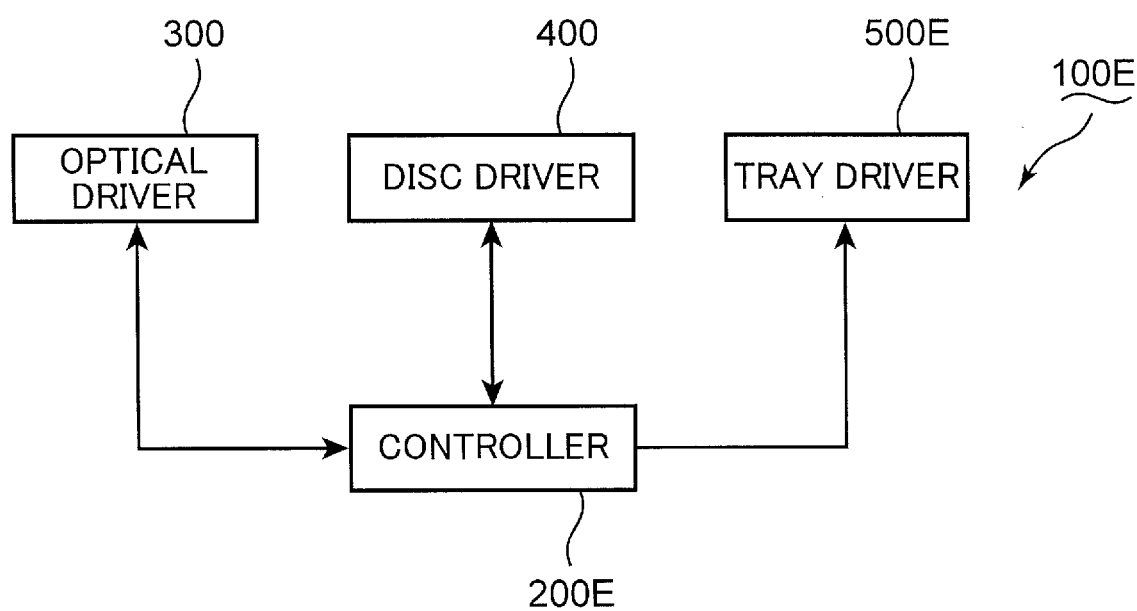
FIG. 21 is a schematic block diagram of an optical disc apparatus according to the sixth embodiment.

FIG. 21 is a schematic block diagram of an optical disc apparatus 100E. The optical disc apparatus 100E is described with reference to FIG. 21. The same components as the first and/or fifth embodiments are denoted with the same reference symbols. The description in the first and/or fifth embodiments is applicable to the components denoted with the same reference symbols.

Like the first embodiment, the optical disc apparatus 100E includes the optical driver 300 and the disc driver 400. The optical disc apparatus 100E further includes a controller 200E and a tray driver 500E. The controller 200E controls the optical driver 300, the disc driver 400 and the tray driver 500.

Figure 22A:
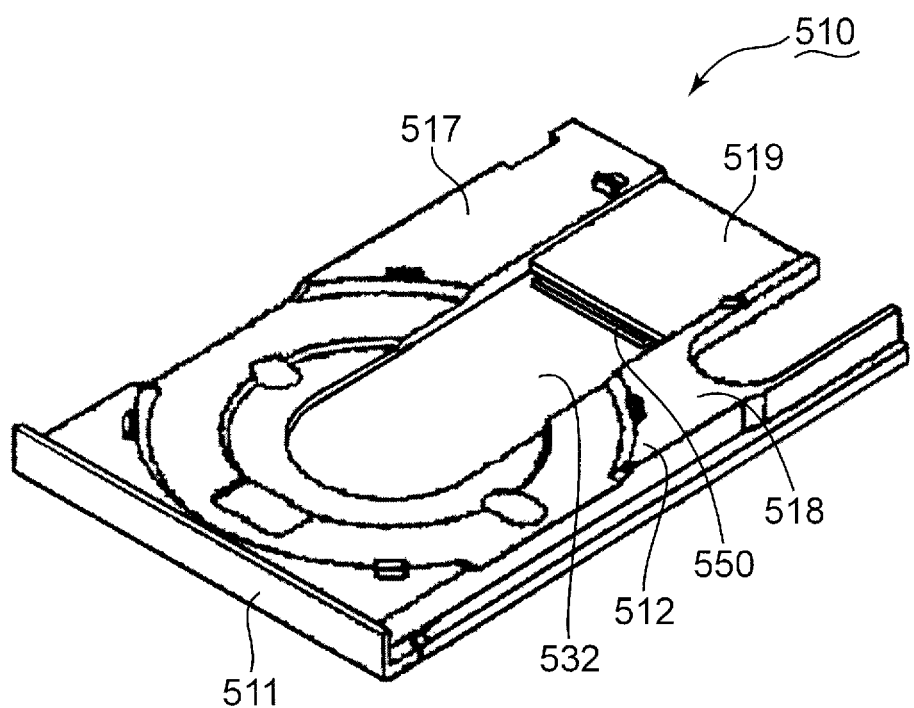
FIG. 22A is a schematic perspective view of a tray plate of the optical disc apparatus in FIG. 21.
Figure 22B:
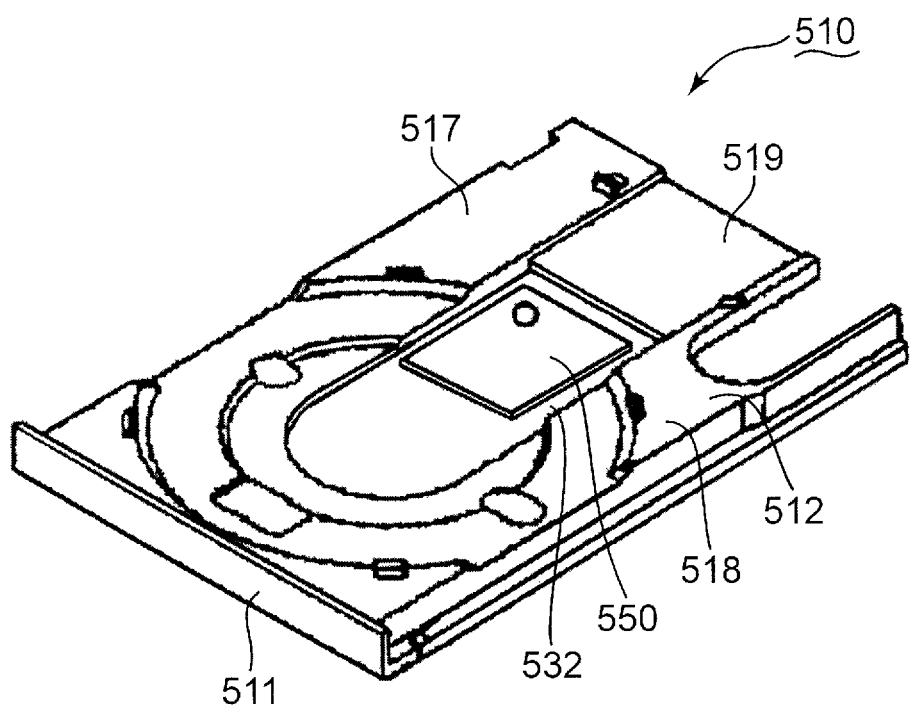
FIG. 22B is a schematic perspective view of the tray plate of the optical disc apparatus in FIG. 21.

FIGS. 22A and 22B are schematic perspective views of the tray plate 510. The tray driver 500E is described with reference to FIGS. 21 to 22B.

Like the first embodiment, the tray driver 500E includes the tray plate 510 and the opening piece 550. The bottom wall 512 of the tray plate 510 includes a left area 517 to the left of the second opening area 532, a right area 518 to the right of the second opening area 532, and a rectangular center area 519 between the left and right areas 517, 518. Edges of the left area 517, the right area 518 and the center area 519 define a contour of the second opening area 532.

FIG. 22A shows the opening piece 550 when the controller 200E executes the information process control. While the controller 200E executes the information process control, the opening piece 550 is situated below the center area 519 and hardly covers the second opening area 532.

FIG. 22B shows the opening piece 550 when the controller 200E executes the cleaning control. While the controller 200E executes the cleaning control, the opening piece 550 is displaced toward the front wall 511 and partially covers the second opening area 532.

Figure 23A:
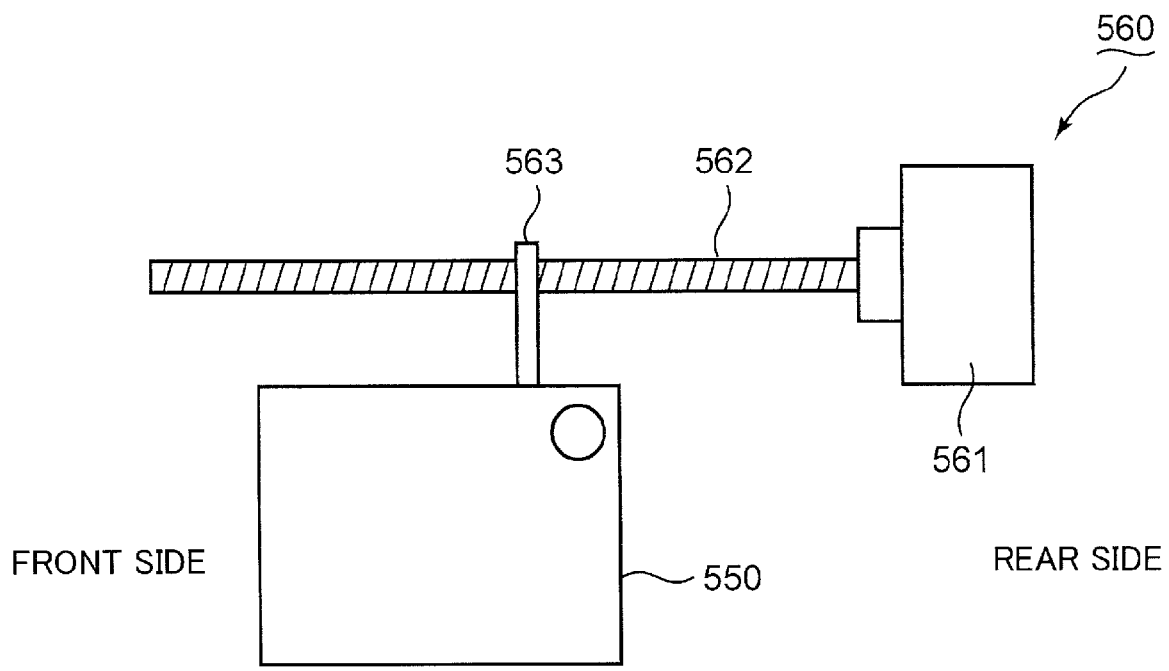
FIG. 23A is a schematic view of an exemplary displacement mechanism of the optical disc apparatus in FIG. 21.
Figure 23B:
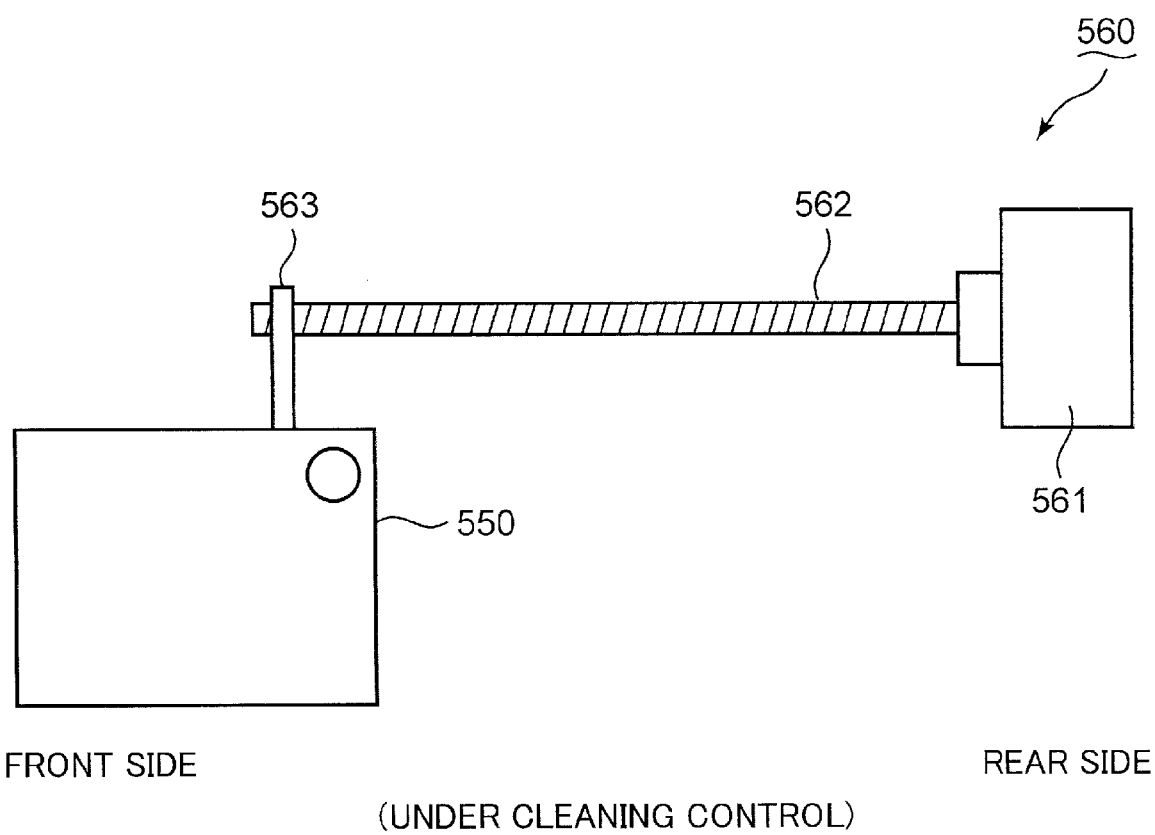
FIG. 23B is a schematic view of the exemplary displacement mechanism of the optical disc apparatus in FIG. 21.

FIGS. 23A and 23B are schematic views of an exemplary displacement mechanism 560 configured to displace the opening piece 550. The displacement mechanism 560 is described with reference to FIGS. 21 to 23B.

The tray driver 500E further includes the displacement mechanism 560. The displacement mechanism 560 includes a stepping motor 561, a screw shaft 562, which is rotated by the stepping motor 561, and a connection piece 563, which is screwed to the screw shaft 562. The opening piece 550 is fixed to the connection piece 563.

The position of the opening piece 550 shown in FIG. 23A corresponds to the position of the opening piece 550 shown in FIG. 22A. The position of the opening piece 550 shown in FIG. 23B corresponds to the position of the opening piece 550 shown in FIG. 22B. The opening piece 550 is displaced forward or backward according to an operation of the stepping motor 561. In this embodiment, the displacement mechanism 560 is exemplified as the second displacement mechanism. Alternatively, the second displacement mechanism may be another mechanism (e.g. a cylinder device or a lever device) configured to displace the opening piece 550.

Figure 24:
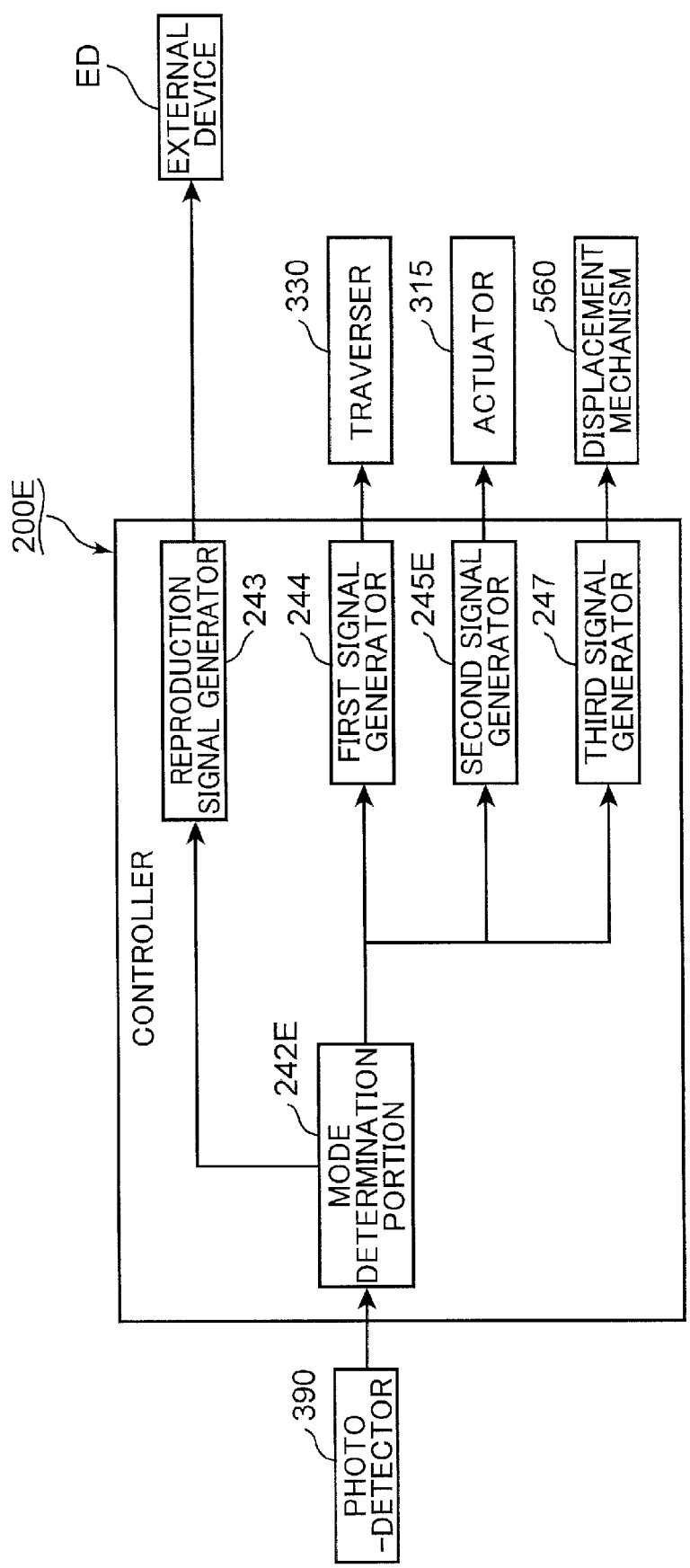
FIG. 24 is a schematic block diagram showing a functional configuration of a controller of the optical disc apparatus in FIG. 21.

FIG. 24 is a schematic block diagram showing a functional configuration of the controller 200E. The controller 200E is described with reference to FIGS. 12C, 22A, 22B and 24.

Like the fifth embodiment, the controller 200E includes the reproduction signal generator 243 and the first signal generator 244. The controller 200E further includes a mode determination portion 242E, a second signal generator 245E and a third signal generator 247.

The mode determination portion 242E outputs information about a selected control mode to the first to third signal generators 244, 245E, 247. The photo-detector 390 generates electric signals in response to an amount of received light. The mode determination portion 242E which determines the information process control as the control mode sets the reproduction signal generator 243 as an output destination of the electric signals from the photo-detector 390. The reproduction signal generator 243 generates the reproduction signals in response to the electric signals from the mode determination portion 242E. The reproduction signals are output from the reproduction signal generator 243 to an external device ED (e.g. personal computer). The external device ED reproduces information recorded on the optical disc OD. Meanwhile, the first signal generator 244 generates first drive signals for driving the traverser 330. The first drive signals are output from the first signal generator 244 to the traverser 330. The traverser 330 displaces the objective lens unit 350 in the tracking direction in response to the first drive signals. If the mode determination portion 242E determines the information process control as the control mode, the second signal generator 245E generates second drive signals for driving the actuator 315. The second drive signals are output from the second signal generator 245E to the actuator 315. The actuator 315 displaces the objective lens 351 in the tracking and/or focusing directions in response to the second drive signals. Meanwhile, the third signal generator 247 generates third drive signals for retracting the opening piece 550 from the second opening area 532. The third drive signals are output from the third signal generator 247 to the displacement mechanism 560. The displacement mechanism 560 displaces the opening piece 550 in response to the third drive signals to open the second opening area 532.

The mode determination portion 242E which determines the cleaning control as the control mode stops output of the electric signals to the reproduction signal generator 243. Meanwhile, the mode determination portion 242 allows the first signal generator 244 to generate first drive signals for positioning the objective lens unit 350 at the outer position (c.f. FIG. 12C). The first drive signals are output from the first signal generator 244 to the traverser 330. The traverser 330 positions the objective lens unit 350 at the outer position in response to the first drive signals.

After the objective lens unit 350 is positioned at the outer position by the traverser 330, the mode determination portion 242E allows the third signal generator 247 to generate third drive signals for displacing the opening piece 550 into the second opening area 532. The displacement mechanism 560 displaces the opening piece 550 in response to the third drive signals. Accordingly, the opening piece 550 partially covers the second opening area 532.

Figure 25:
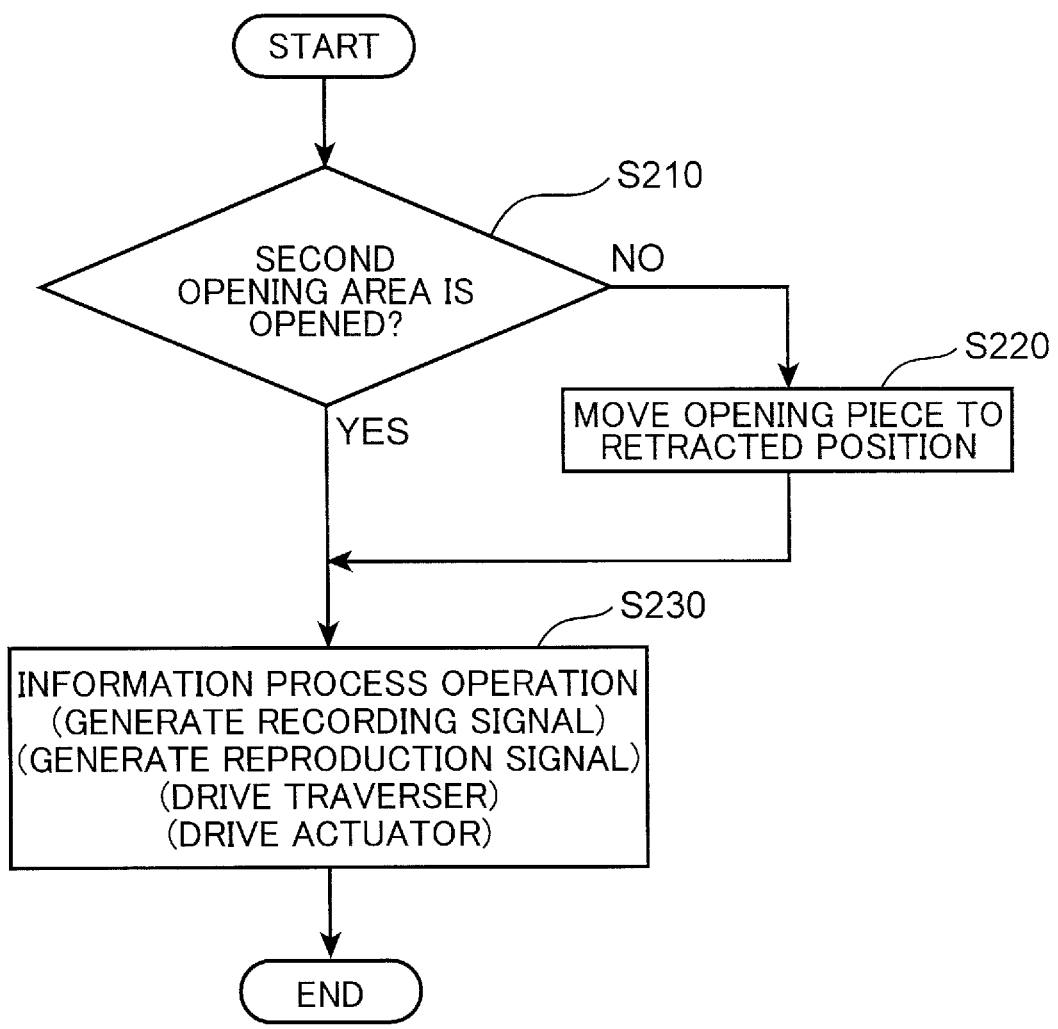
FIG. 25 is a schematic flowchart showing an operation of the controller in FIG. 24 (information process control).

FIG. 25 is a schematic flowchart showing an operation of the controller 200E which executes the information process control. The operation of the controller 200E is described with reference to FIGS. 12B, 21 to 25.

(Step S210)

In step S210, the controller 200E checks whether the second opening area 532 is opened. If the opening piece 550 exists in the second opening area 532, step S220 is executed. Otherwise step S230 is executed.

(Step S220)

In step S220, the controller 200E controls the displacement mechanism 560 to retract the opening piece 550 from the second opening area 532. Accordingly, the second opening area 532 is opened. Then step S230 is executed.

(Step S230)

In step S230, the controller 200E executes the information process operation. If the information is recorded onto the optical disc OD, the controller 200E may generate recording signals. If information is reproduced from the optical disc OD, the controller 200E may generate reproduction signals. The controller 200E drives the traverser 330 and the actuator 315 during the generation of the recording or reproduction signals. The operation of the controller 200E in step S230 may be similar to that of a conventional device which performs information process on a BD or DVD.

Figure 26:
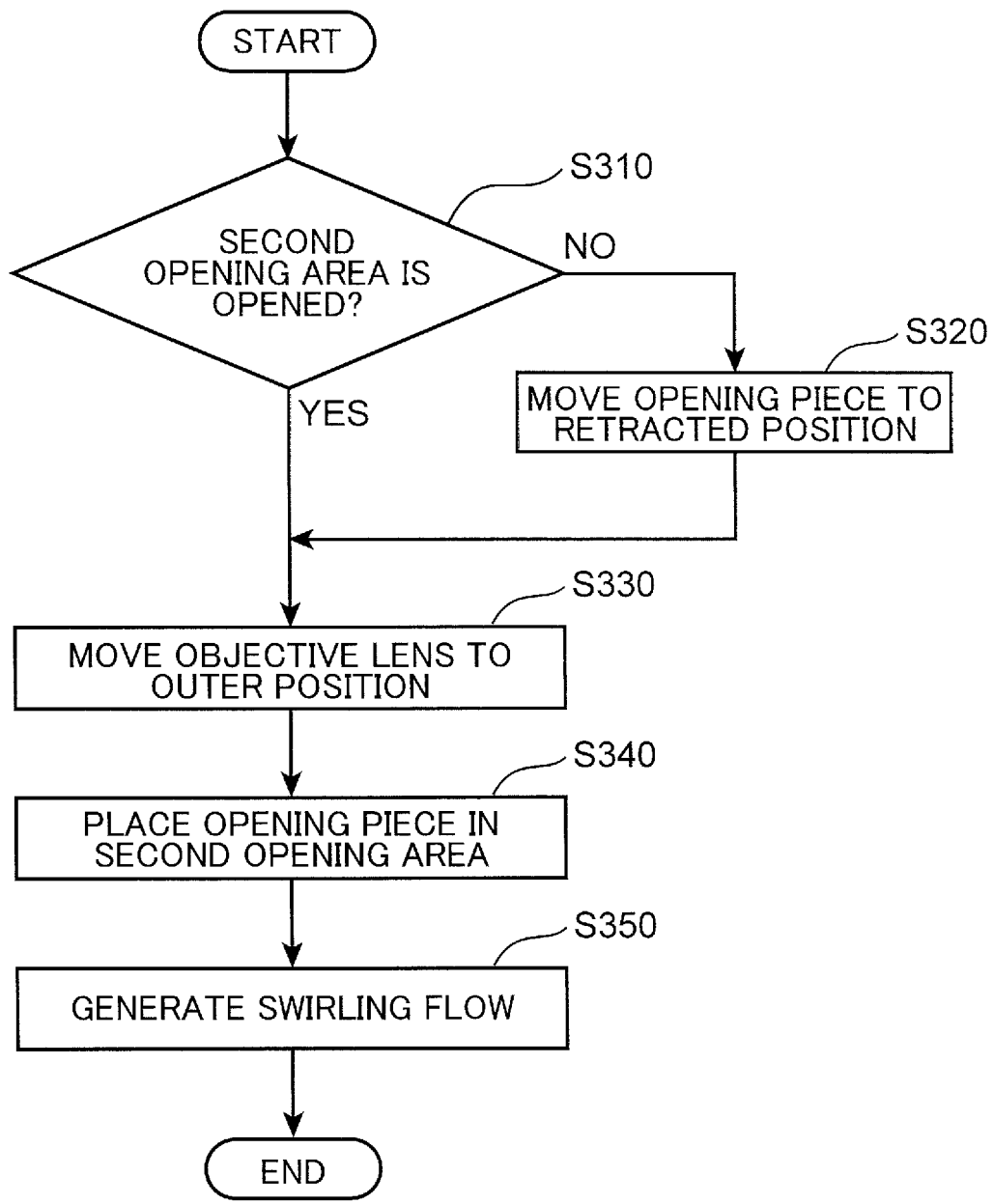
FIG. 26 is a schematic flowchart showing an operation of the controller in FIG. 24 (cleaning control).

FIG. 26 is a schematic flowchart showing an operation of the controller 200E which executes the cleaning control. The operation of the controller 200E is described with reference to FIGS. 12B, 21 to 24 and 26.

(Step S310)

In step S310, the controller 200E checks whether the second opening area 532 is opened. If the opening piece 550 exists in the second opening area 532, step S320 is executed. Otherwise step S330 is executed.

(Step S320)

In step S320, the controller 200E controls the displacement mechanism 560 to retract the opening piece 550 from the second opening area 532. Accordingly, the second opening area 532 is opened. Then step S330 is executed.

(Step S330)

In step S330, the controller 200E controls the traverser 330 to displace the objective lens 351 at the outer position. Then step S340 is executed.

(Step S340)

In step S340, the controller 200E controls the displacement mechanism 560 to displace the opening piece 550 to the second opening area 532. Accordingly, the opening piece 550 is inserted between the optical disc OD and the objective lens 351. Then step S350 is executed.

(Step S350)

In step S350, the controller 200E controls the disc driver 400 to rotate the optical disc OD. Accordingly, a swirling flow is generated. The swirling flow is blown from the opening 551 formed in the opening piece 550, and hits the objective lens 351. Consequently, dust is removed from the objective lens 351.

Seventh Embodiment

A displacement distance of the opening piece described in the context of the sixth embodiment may be designed too long in the optical disc apparatus. Techniques to shorten the displacement distance of the opening piece are described in this embodiment.

Figure 27A:
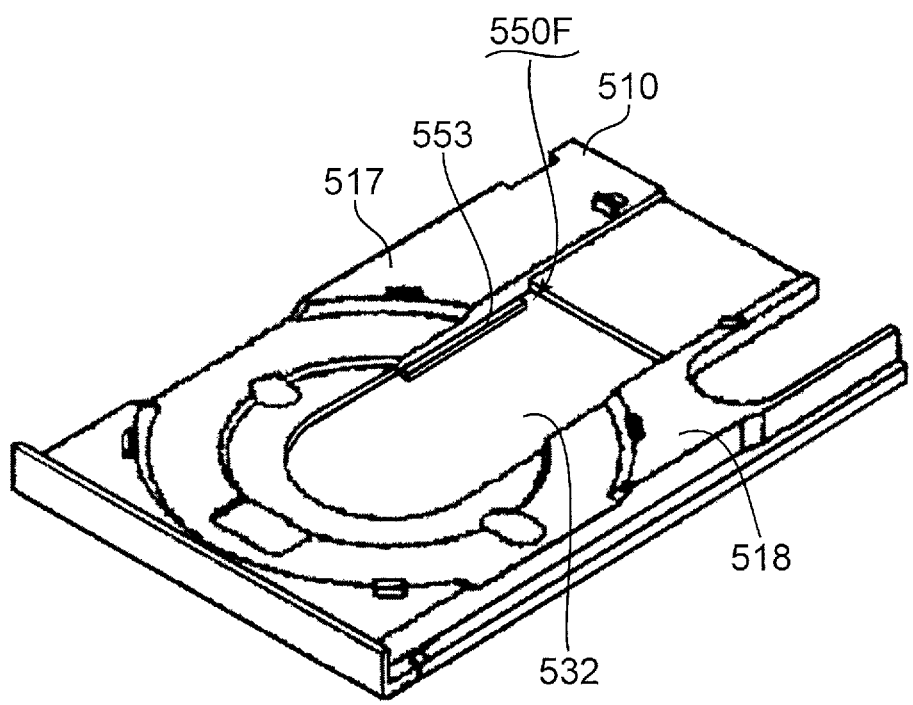
FIG. 27A is a schematic perspective view of an opening piece which is displaced under the tray plate (Seventh Embodiment).
Figure 27B:
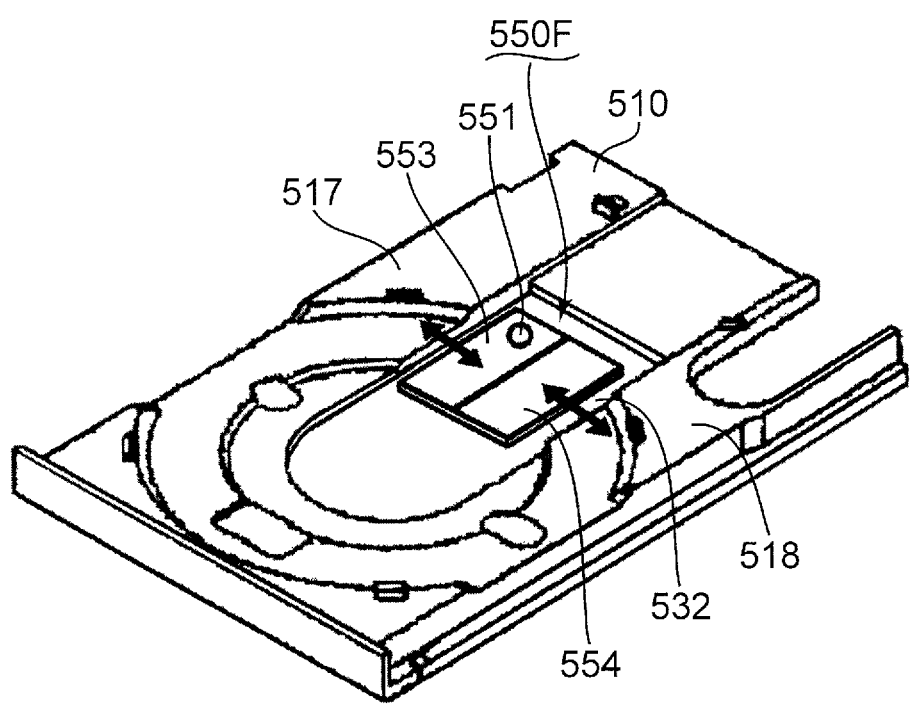
FIG. 27B is a schematic perspective view of the opening piece which is displaced under the tray plate (Seventh Embodiment).

FIGS. 27A and 27B are schematic perspective views of an opening piece 550F, which is displaced under the tray plate 510. The opening piece 550F is described with reference to FIGS. 27A and 27B. The same components as the sixth embodiment are denoted with the same reference symbols. The description in the sixth embodiment is applicable to the components denoted with the same reference symbols.

The opening piece 550F includes a first plate 553 and a second plate 554. The opening 551 is formed in the first plate 553 whereas no opening is formed in the second plate 554. A position at which the opening is formed may be determined on the basis of a rotational direction of the optical disc. In short, if the second plate is situated at the upstream of the first plate in the rotational direction of the optical disc, the opening may be formed in the second plate.

FIG. 27A is a schematic view of a position of the opening piece 550F under the information process control. FIG. 27B is a schematic view of a position of the opening piece 550F under the cleaning control. Under the cleaning control, the first plate 553 is adjacent to the left area 517 and partially covers the second opening area 532. Under the cleaning control, the second plate 554 is adjacent to the right area 518 and at least partially covers the second opening area 532.

Unlike the sixth embodiment, the first and second plates 553, 554 are displaced substantially orthogonally to the moving direction of the tray plate 510. Displacement amounts of the first and second plates 553, 554 are designed to be shorter than the sixth embodiment. A structure for driving the first and second plates 553, 554 may be the same as the sixth embodiment.

Eighth Embodiment

In the sixth and seventh embodiments, the opening piece is mechanically driven. Alternatively, the opening piece may be manually placed on the tray plate. In this embodiment, a cleaning sheet is described as an opening piece which is manually placed.

Figure 28:
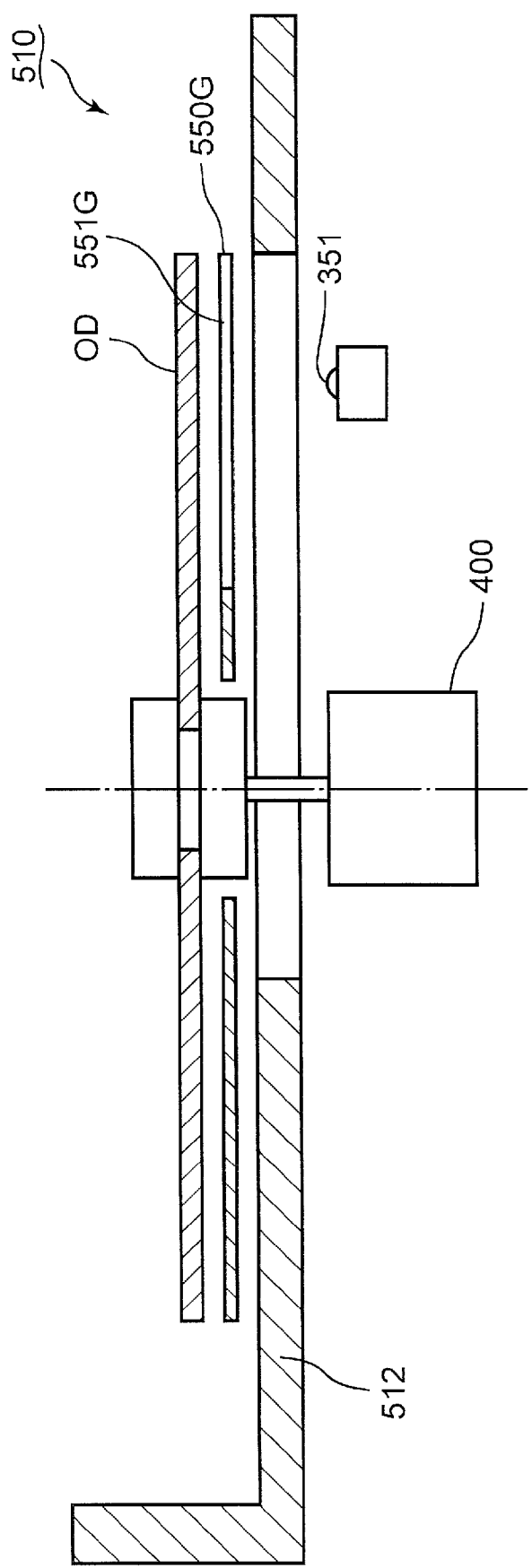
FIG. 28 is a schematic cross-sectional view of a tray plate (Eighth Embodiment).

FIG. 28 is a schematic cross-sectional view of the tray plate 510. The cleaning sheet 550G is described with reference to FIG. 28. The same components as the first embodiment are denoted with the same reference symbols. The description in the first embodiment is applicable to the components denoted with the same reference symbols.

The cleaning sheet 550G is placed between the bottom wall 512 of the tray plate 510 and the optical disc OD supported by the disc driver 400. Unlike the optical disc OD, the cleaning sheet 550G is not connected to the disc driver 400. Therefore, the cleaning sheet 550G remains immovable on the bottom wall 512, even when the optical disc OD rotates.

The cleaning sheet 550G exists between the objective lens 351 and the optical disc OD. A slot 551G as the opening is formed in the cleaning sheet 550G above the objective lens 351. Therefore, the cleaning sheet 550G does not interrupt the optical information process using the objective lens 351. In this embodiment, the cleaning sheet 550G is exemplified as the sheet member.

Figure 29:
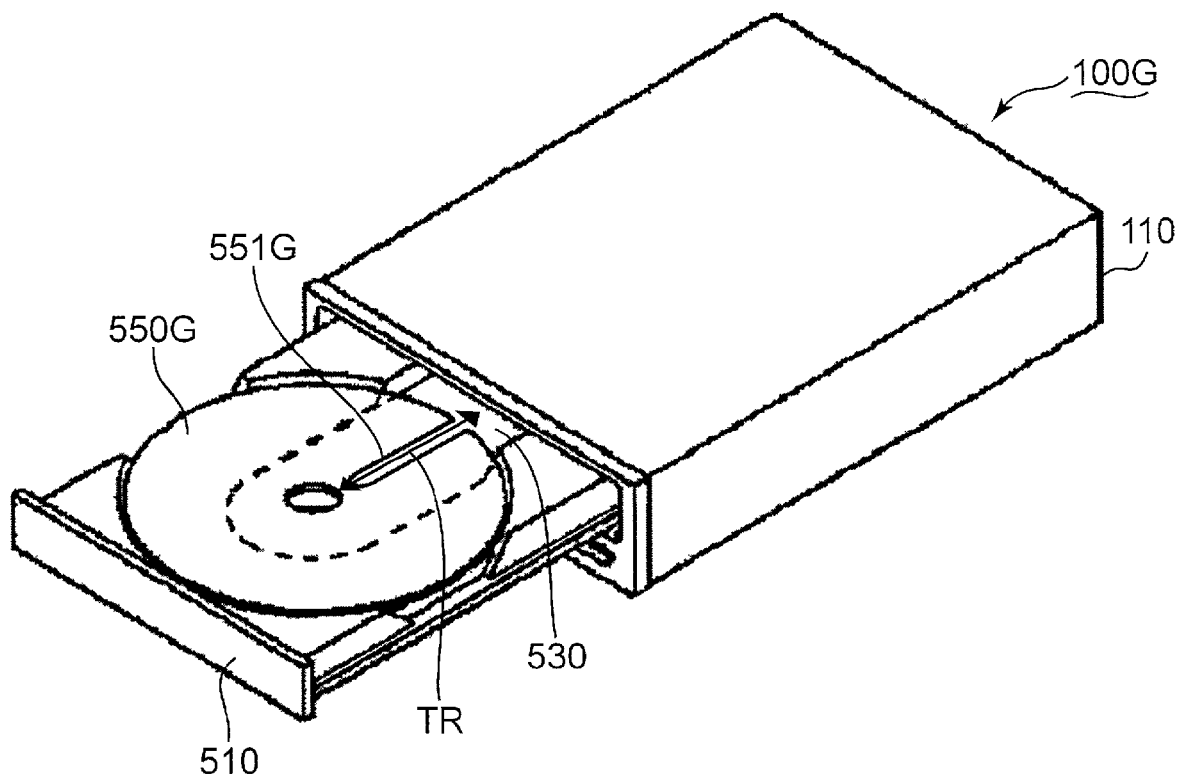
FIG. 29 is a schematic perspective view of an optical disc apparatus in the eighth embodiment.
Figure 30:
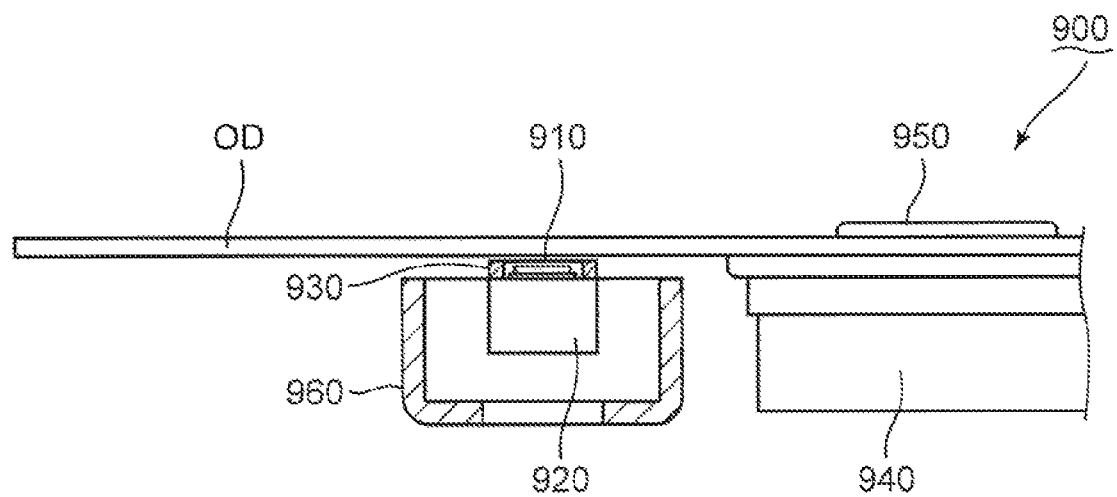
FIG. 30 is a schematic cross-sectional view of a conventional optical disc apparatus.
Figure 31:
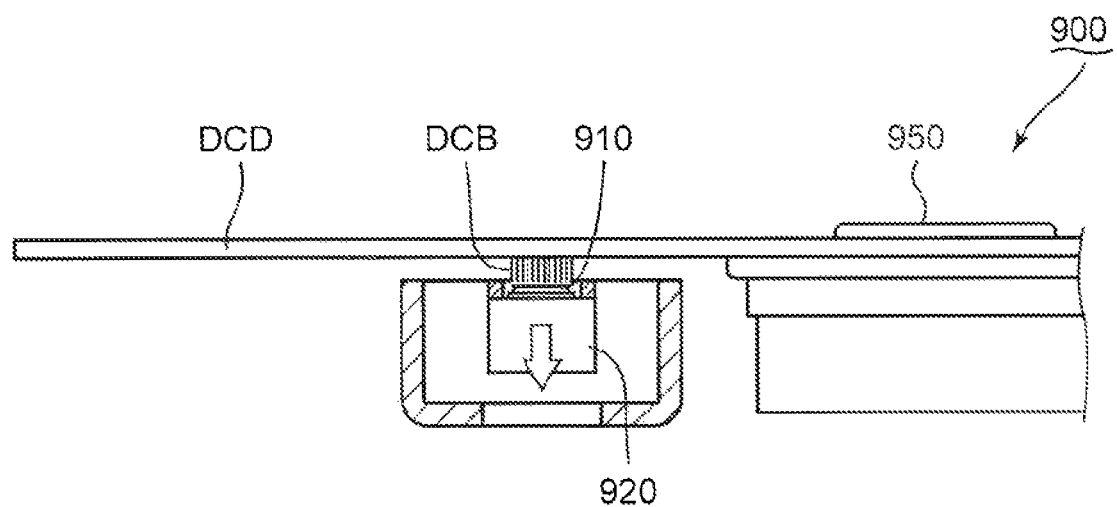
FIG. 31 is a schematic cross-sectional view of the optical disc apparatus in FIG. 30.
Figure 32:
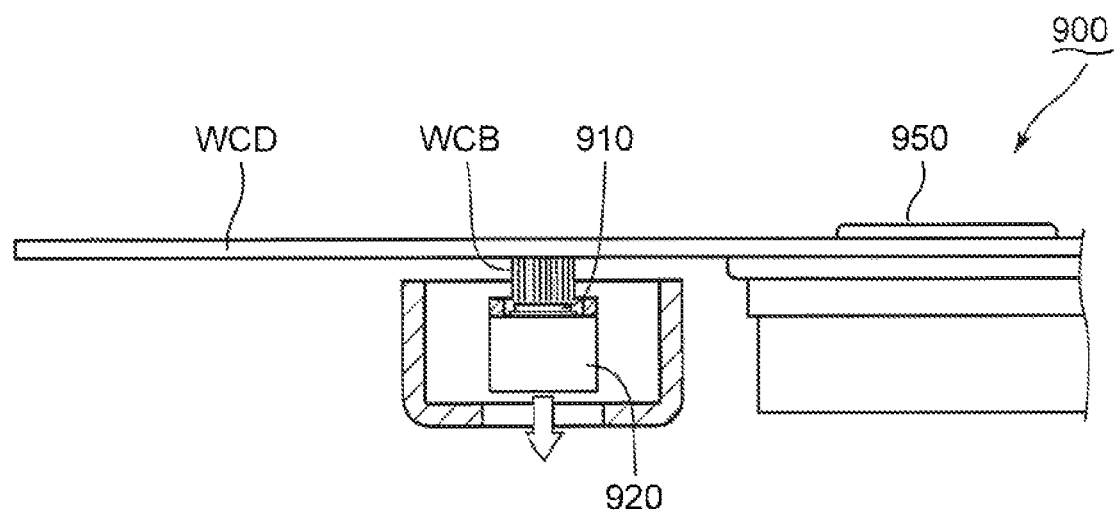
FIG. 32 is a schematic cross-sectional view of the optical disc apparatus in FIG. 30.
Figure 33:
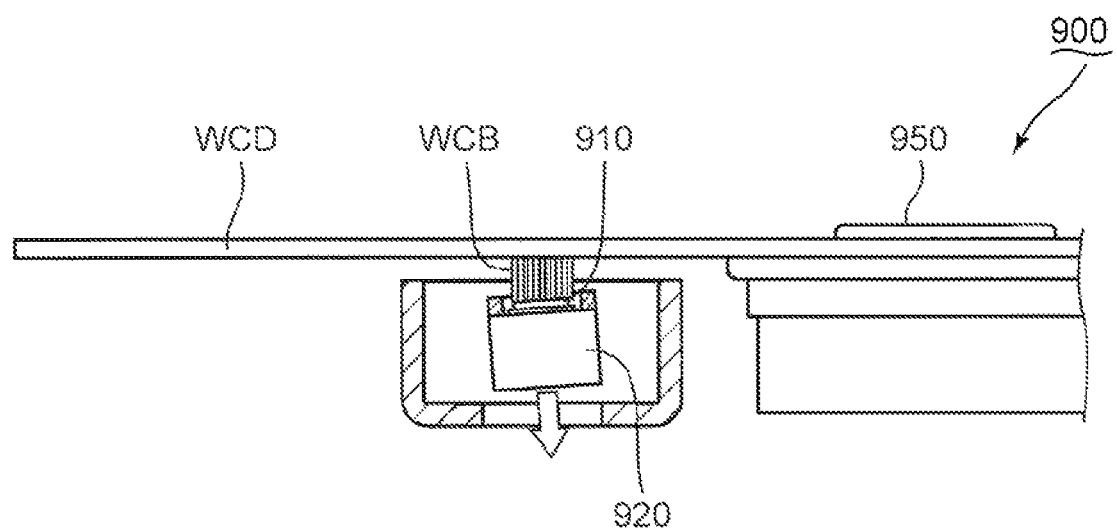
FIG. 33 is a schematic cross-sectional view of the optical disc apparatus in FIG. 30.

FIG. 29 is a schematic perspective view of the optical disc apparatus 100G in which the cleaning sheet 550G is placed. The cleaning sheet 550G is further described with reference to FIGS. 28 and 29.

As shown in FIG. 29, a user may place the tray plate 510 at the ejection position to put the cleaning sheet 550G on the tray plate 510. Accordingly, the cleaning sheet 550G partially covers the opening area 530.

FIG. 29 shows a track line TR on the tray plate 510, the track line TR indicating a moving track of the objective lens 351. As shown in FIG. 29, the slot 551G extends along the track line TR. Therefore, the cleaning sheet 550G does not interrupt the optical information process using the objective lens 351.

After the cleaning sheet 550G is placed on the tray plate 510, the user may put the optical disc OD on the cleaning sheet 550G. The user then displaces the tray plate 510 into the housing 110.

If the disc driver 400 rotates the optical disc OD, a swirling flow is generated. The swirling flow hits the objective lens 351 through the slot 551G and removes dust.

The exemplary optical disc apparatuses described in the context of the aforementioned various embodiments primarily have the following features.

An optical disc apparatus according to one aspect of the aforementioned embodiments includes: a drive mechanism configured to rotate a medium including a processing surface to be subjected to optical information process; a housing configured to store the drive mechanism; a tray mechanism configured to displace the medium between a storage position, at which the medium is stored in the housing, and an ejection position, at which the medium is ejected from the housing; at least one objective lens which condenses light onto the processing surface of the medium situated in the storage position to perform the information process; and a first displacement mechanism configured to displace the at least one objective lens along the processing surface between a first position and a second position which is more distant from the rotational center of the medium rotated by the drive mechanism than the first position is. The tray mechanism defines at least one opening in a position closer to the second position than the first position.

According to the aforementioned configuration, the first displacement mechanism displaces at least one objective lens between the first and second positions while the drive mechanism rotates the medium including the processing surface to be subjected to the optical information process. Accordingly, the optical disc apparatus may perform the optical information process.

Air flow results from rotation of the medium. The air flow is stronger in the second position than the first position since the second position is more distant from the rotational center of the medium than the first position is. The tray mechanism defines at least one opening in a position closer to the second position than the first position. Therefore, the air is strongly blown from the at least one opening. The optical disc apparatus may utilize the air blown from the at least one opening to clean the at least one objective lens without contact.

In the aforementioned configuration, the drive mechanism may rotate the medium to cause air flow in the housing. The first displacement mechanism may expose the at least one objective lens to the air flow blown from the at least one opening.

According to the aforementioned configuration, the air flow is generated in the housing when the drive mechanism rotates the medium. The first displacement mechanism exposes the at least one objective lens to the air flow blown from the at least one opening. Therefore, the at least one objective lens is cleaned by the air flow appropriately.

In the aforementioned configuration, the tray mechanism may include a tray plate defining a rotation space, in which the medium rotates, and an opening piece provided with the at least one opening. The tray plate may be provided with an opening area to allow displacement of the medium between the storage position and the ejection position. The opening piece may be situated so that the at least one opening is overlapped with the opening area.

According to the aforementioned configuration, the at least one opening formed in the opening piece is overlapped with the opening area which allows displacement of the tray plate. Therefore, the air flow resultant from the rotation of the medium is blown from the at least one opening. Accordingly, the optical disc apparatus may utilize the air blown from the at least one opening to clean the at least one objective lens without contact.

In the aforementioned configuration, the optical disc apparatus further includes a controller configured to selectively execute information process control for executing the information process and the cleaning control for cleaning the at least one objective lens. The tray mechanism may include a second displacement mechanism configured to displace the opening piece between the medium and the tray plate. The first displacement mechanism may displace the at least one objective lens in the opening area between the first and second positions to execute the information process under the control of the controller while the controller executes the information process control. The second displacement mechanism may place the opening piece between the at least one objective lens and the medium under the control of the controller while the controller executes the cleaning control.

According to the aforementioned configuration, the second displacement mechanism places the opening piece between the at least one objective lens and the medium under the control of the controller while the controller executes the cleaning control. Therefore, the at least one objective lens is exposed to the strong air flow blown from the opening. Accordingly, the at least one objective lens is appropriately cleaned by the air flow.

In the aforementioned configuration, the opening piece may be a sheet member situated between the at least one objective len and the medium. The sheet member may partially cover the opening area.

According to the aforementioned configuration, the sheet member partially covers the opening area. Therefore, strength of the air flow resultant from the rotation of the medium may be maintained at a level sufficient for cleaning the at least one objective lens in the opening formed in the sheet member. Accordingly, the at least one objective lens is appropriately cleaned by the air flow.

In the aforementioned configuration, the optical disc apparatus may further include a detector configured to detect an amount of incident light, which enters the at least one objective lens, and an adjuster configured to adjust a position of the at least one objective lens in the tracking direction and the focusing direction. The adjuster may adjust the position of the at least one objective lens in response to the amount of the incident light under the control of the controller.

According to the aforementioned configuration, the adjuster adjusts the position of the at least one objective lens in response to the amount of the incident light under the control of the controller. Therefore, the at least one objective lens is effectively cleaned by the air flow.

In the aforementioned configuration, the optical disc apparatus may further include a vibrator configured to vibrate the at least one objective lens. The vibrator may vibrate the at least one objective lens under the control of the controller while the controller executes the cleaning control.

According to the aforementioned configuration, the vibrator vibrates the at least one objective lens under the control of the controller while the controller executes the cleaning control. Therefore, the optical disc apparatus may use not only the air flow but also the vibration to effectively clean the at least one objective lens.

In the aforementioned configuration, the at least one opening may include an upstream opening situated upstream in a rotational direction of the medium with respect to a moving track of the at least one objective lens which moves between the first and second positions.

According to the aforementioned configuration, the upstream opening is situated upstream in the rotational direction of the medium with respect to the moving track of the at least one objective lens which moves between the first and second positions. Therefore, the at least one objective lens is effectively cleaned by the air flow.

In the aforementioned configuration, the first displacement mechanism may position the at least one objective lens so that the at least one objective lens is exposed to the air flow blown from the upstream opening under the control of the controller while the controller executes the cleaning control. A distance between the upstream opening and the rotational center may be shorter than a distance between the rotational center and the at least one objective lens while the controller executes the cleaning control.

According to the aforementioned configuration, the distance between the upstream opening and the rotational center is shorter than the distance between the rotational center and the at least one objective lens while the controller executes the cleaning control. Therefore, the at least one objective lens is effectively cleaned by the air flow.

In the aforementioned configuration, the at least one objective lens may include a first objective lens and a second objective lens. The at least one opening may include a first opening and a second opening. The first objective lens may be exposed to the air flow blown from the first opening. The second objective lens may be exposed to the air flow blown from the second opening.

According to the aforementioned configuration, the first objective lens is exposed to the air flow blown from the first opening. Therefore, the first objective lens is appropriately cleaned by the air flow. The second objective lens is exposed to the air flow blown from the second opening. Therefore, the second objective lens is appropriately cleaned by the air flow.

In the aforementioned configuration, the second displacement mechanism may remove the opening piece from a space between the at least one objective lens and the medium under the control of the controller while the controller executes the information process control.

According to the aforementioned configuration, the second displacement mechanism removes the opening piece from the space between the at least one objective lens and the medium under the control of the controller while the controller executes the information process control. Therefore, the first displacement mechanism may appropriately displace the at least one objective lens between the first and second positions.

In the aforementioned configuration, the medium may include a periphery defining a contour of the medium. The first displacement mechanism may place the at least one objective lens outside a circular area around the rotational center under the control of the controller while the controller executes the cleaning control. The circular area has a radius which is ½ times as long as a distance between the periphery and the rotational center.

According to the aforementioned configuration, the first displacement mechanism places the at least one objective lens outside the circular area around the rotational center under the control of the controller. The circular area has a radius which is ½ times as long as the distance between the periphery and the rotational center. Therefore, the at least one objective lens is exposed to the strong air flow. Accordingly, the optical disc apparatus may appropriately clean the at least one objective lens.

In the aforementioned configuration, the first displacement mechanism may place the at least one objective lens to face the processing surface under the control of the controller while the controller executes the cleaning control.

According to the aforementioned configuration, the first displacement mechanism places the at least one objective lens to face the processing surface under the control of the controller while the controller executes the cleaning control. Therefore, the at least one objective lens is exposed to the strong air flow. Accordingly, the optical disc apparatus may appropriately clean the at least one objective lens.

In the aforementioned configuration, the at least one opening may be a slot extending along a moving track of the at least one objective lens which moves between the first and second positions.

According to the aforementioned configuration, the slot extending along the moving track of the at least one objective lens which moves between the first and second positions is formed in the sheet member. Therefore, the information process is appropriately executed when the sheet member is disposed.

In the aforementioned configuration, the optical information process may be at least one of recording information on the medium and reproducing information from the medium.

According to the aforementioned configuration, the optical disc apparatus may appropriately execute at least one of recording information on the medium and reproducing information from the medium.

The exemplary sheet member described in the context of the aforementioned various embodiments primarily has the following features.

A sheet member according to another aspect of the aforementioned embodiments is mounted on a tray plate to be displaced between a storage position, at which a medium to be subjected to optical information process is stored in a housing, and an ejection position, at which the medium is ejected from the housing. The sheet member partially covers an opening area which is formed in the tray plate to allow the displacement of the tray plate between the storage position and the ejection position. The sheet member is provided with an opening to blow air flow generated in the housing by the rotation of the medium.

According to the aforementioned configuration, the sheet member partially covers the opening area. Therefore, strength of the air flow resultant from the rotation of the medium may be maintained at a high level in the opening formed in the sheet member. Accordingly, the sheet member may cause an air flow to be used for the cleaning process.

The exemplary cleaning method for an objective lens described in the context of the aforementioned various embodiments primarily has the following features.

A cleaning method for an objective lens according to another aspect of the aforementioned embodiments has steps of: placing an opening piece provided with an opening between a medium, which includes a processing surface to be subjected to optical information process and at least one objective lens facing the processing surface, so that the opening piece partially covers an opening area formed in the tray plate to allow displacement of the tray plate on which the medium is mounted; and generating air flow by the rotation of the medium to expose the at least one objective lens to the air flow blown from the opening.

According to the aforementioned configuration, the opening piece partially covers the opening area. Therefore, strength of the air flow resultant from the rotation of the medium may be maintained at a high level in the opening formed in the opening piece. Accordingly, the at least one objective lens is appropriately cleaned by the air flow blown from the opening.

INDUSTRIAL APPLICABILITY

The aforementioned principle of the various embodiments enables to clean an objective lens without contact under an air flow. Therefore, this principle may be applied to various devices configured to execute optical information process using an objective lens (e.g. computer device, video recording device, video reproduction device, car navigation system, portable music player, digital still camera and digital video camera).

The invention claimed is:

1. An optical disc apparatus, comprising:
a drive mechanism configured to rotate a medium including a processing surface to be subjected to an optical information process;
a housing configured to store the drive mechanism;
a tray mechanism configured to displace the medium between a storage position, at which the medium is stored in the housing, and an ejection position, at which the medium is ejected from the housing;
at least one objective lens which condenses light onto the processing surface of the medium situated at the storage position to perform the information process; and
a first displacement mechanism configured to displace the at least one objective lens along the processing surface between a first position and a second position which is more distant from a rotational center of the medium rotated by the drive mechanism than the first position is, wherein
the tray mechanism defines at least one opening in a position closer to the second position than the first position,
the drive mechanism rotates the medium to cause air flow in the housing,
the first displacement mechanism places the at least one objective lens at the second position to cause the at least one objective lens to be exposed to the air flow blown from the at least one opening,
the tray mechanism includes a tray plate defining a rotation space, in which the medium rotates, and an opening piece provided with the at least one opening,
the tray plate is provided with an opening area to allow the tray mechanism to displace the medium between the storage position and the ejection position, and
the opening piece is situated so that the at least one opening is overlapped with the opening area.

2. The optical disc apparatus according to claim 1, further comprising a controller configured to selectively execute information process control for executing the information process and cleaning control for cleaning the at least one objective lens, wherein
the tray mechanism includes a second displacement mechanism configured to displace the opening piece between the medium and the tray plate,
the first displacement mechanism displaces the at least one objective lens in the opening area between the first and second positions to execute the information process under control of the controller while the controller executes the information process control, and
the second displacement mechanism places the opening piece between the at least one objective lens and the medium under the control of the controller while the controller executes the cleaning control.

3. The optical disc apparatus according to claim 2, further comprising:
a detector configured to detect an amount of incident light which enters the at least one objective lens; and
an adjuster configured to adjust a position of the at least one objective lens in a tracking direction and a focusing direction, wherein
the adjuster adjusts the position of the at least one objective lens in response to the amount of the incident light under the control of the controller.

4. The optical disc apparatus according to claim 2, further comprising a vibrator configured to vibrate the at least one objective lens, wherein
the vibrator vibrates the at least one objective lens under the control of the controller while the controller executes the cleaning control.

5. The optical disc apparatus according to claim 2, wherein
the at least one opening includes an upstream opening situated upstream in a rotational direction of the medium with respect to a moving track of the at least one objective lens which moves between the first and second positions.

6. The optical disc apparatus according to claim 5, wherein
the first displacement mechanism positions the at least one objective lens under the control of the controller so that the at least one objective lens is exposed to the air flow blown from the upstream opening while the controller executes the cleaning control; and
a distance between the upstream opening and the rotational center is shorter than a distance between the rotational center and the at least one objective lens while the controller executes the cleaning control.

7. The optical disc apparatus according to claim 2, wherein
the second displacement mechanism removes the opening piece from a space between the at least one objective lens and the medium under the control of the controller while the controller executes the information process control.

8. The optical disc apparatus according to claim 2, wherein
the medium includes a periphery which defines a contour of the medium, and
the first displacement mechanism places the at least one objective lens outside a circular area around the rotational center under the control of the controller while the controller executes the cleaning control, the circular area having a radius which is ½ times as long as a distance between the periphery and the rotational center.

9. The optical disc apparatus according to claim 8, wherein
the first displacement mechanism places the at least one objective lens to face the processing surface under the control of the controller while the controller executes the cleaning control.

10. The optical disc apparatus according to claim 1, wherein
the opening piece is a sheet member situated between the at least one objective lens and the medium, and
the sheet member partially covers the opening area.

11. The optical disc apparatus according to claim 10, wherein
the at least one opening is a slot extending along a moving track of the at least one objective lens which moves between the first and second positions.

12. The optical disc apparatus according to claim 1, wherein
the optical information process is at least one of recording information on the medium and reproducing information from the medium.

13. An optical disc apparatus, comprising:
a drive mechanism configured to rotate a medium including a processing surface to be subjected to an optical information process;
a housing configured to store the drive mechanism;
a tray mechanism configured to displace the medium between a storage position, at which the medium is stored in the housing, and an ejection position, at which the medium is ejected from the housing;

at least one objective lens which condenses light onto the processing surface of the medium situated at the storage position to perform the information process; and a first displacement mechanism configured to displace the at least one objective lens along the processing surface between a first position and a second position which is more distant from a rotational center of the medium rotated by the drive mechanism than the first position is, wherein the tray mechanism defines at least one opening in a position closer to the second position than the first position, the drive mechanism rotates the medium to cause air flow in the housing, the first displacement mechanism places the at least one objective lens at the second position to cause the at least one objective lens to be exposed to the air flow blown from the at least one opening, the at least one objective lens includes a first objective lens and a second objective lens, the at least one opening includes a first opening and a second opening, the first objective lens is exposed to the air flow blown from the first opening, and the second objective lens is exposed to the air flow blown from the second opening.

14. The optical disc apparatus according to claim 13, wherein the optical information process is at least one of recording information on the medium and reproducing information from the medium.

* * * * *